United States Patent
Hayakawa

(10) Patent No.: US 10,151,877 B2
(45) Date of Patent: Dec. 11, 2018

(54) OPTICAL CIRCUIT MODULE, OPTICAL TRANSCEIVER USING THE SAME, AND SEMICONDUCTOR PHOTONIC DEVICE

(71) Applicants: FUJITSU LIMITED, Kawasaki-shi, Kanagawa (JP); Photonics Electronics Technology Research Association, Bunkyo-ku, Tokyo (JP)

(72) Inventor: Akinori Hayakawa, Sagamihara (JP)

(73) Assignees: FUJITSU LIMITED, Kawasaki (JP); PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/607,957

(22) Filed: May 30, 2017

(65) Prior Publication Data

US 2017/0351024 A1    Dec. 7, 2017

(30) Foreign Application Priority Data

Jun. 2, 2016    (JP) ................................. 2016-111257

(51) Int. Cl.
    *G02B 6/12*    (2006.01)

(52) U.S. Cl.
    CPC ...... *G02B 6/12* (2013.01); *G02B 2006/12085* (2013.01); *G02B 2006/12147* (2013.01); *G02B 2006/12159* (2013.01)

(58) Field of Classification Search
    CPC ............ G02B 6/12; G02B 2006/12147; G02B 2006/12159; G02B 2006/12085
    See application file for complete search history.

(56) References Cited

U.S. PATENT DOCUMENTS

| 6,400,500 B1* | 6/2002 | Tidmarsh ................. G02B 6/26 359/344 |
| 8,503,072 B2* | 8/2013 | Hatakeyama ......... H01S 5/0655 359/344 |

(Continued)

FOREIGN PATENT DOCUMENTS

| JP | 2000-075327 A | 3/2000 |
| JP | 2007-286340 A1 | 11/2007 |

(Continued)

OTHER PUBLICATIONS

S. Stanković, et al.; "Hybrid III-V/Si Distributed-Feedback Laser Based on Adhesive Bonding;" IEEE Photonics Technology Letters; vol. 24; No. 23; Dec. 1, 2002; pp. 2155-2158 (4 Sheets)/p. 2 of specification.

(Continued)

*Primary Examiner* — Ryan A Lepisto
(74) *Attorney, Agent, or Firm* — Kratz, Quintos & Hanson, LLP

(57) ABSTRACT

An optical circuit module comprises a substrate with a first optical coupler connected to a first optical waveguide and a second optical coupler connected to a second optical waveguide on a substrate surface side; and a semiconductor photonic device mounted on the substrate, wherein the semiconductor photonic device has a third optical waveguide and a fourth optical waveguide extending to a first end face that faces the substrate surface, and wherein the third optical waveguide is optically connected to the first optical coupler and the fourth optical waveguide is optically connected to the second optical coupler.

14 Claims, 33 Drawing Sheets

(56) References Cited

U.S. PATENT DOCUMENTS

2007/0274653 A1    11/2007   Watanabe
2012/0027041 A1     2/2012   Yamazaki
2015/0177459 A1     6/2015   Van Campenhout

FOREIGN PATENT DOCUMENTS

JP       2010-219227  A1      9/2010
JP       2015-118372  A1      6/2015
WO    WO 2016011002  A1  *   1/2016   ......... G02B 6/12002

OTHER PUBLICATIONS

R. Budd, et al.; "Semiconductor Optical Amplifier (SOA) Packaging for Scalable and Gain-Integrated Silicon Photonic Switching Platforms;" 2015 Electronic Components & Technology Conference; pp. 1280-1286 (7 Sheets)/p. 3 of specification.

* cited by examiner

OPTICAL CIRCUIT MODULE, OPTICAL TRANSCEIVER USING THE SAME, AND SEMICONDUCTOR PHOTONIC DEVICE

CROSS-REFERENCE TO RELATED APPLICATIONS

This application is based upon and claims the benefit of priority of the prior Japanese Patent Application No. 2016-111257 filed Jun. 2, 2016, which is incorporated herein by references in its entirety.

FIELD

The present invention relates to an optical circuit module, an optical transceiver using the same, and a semiconductor photonic device.

BACKGROUND

Today, functional optical devices integrated in a silicon (Si) photonic substrate attract attention. Such devices are fabricated making use of conventional and inexpensive technologies of forming microelectronic circuits, enabling large-scale integration on Si substrates. For high-performance servers or supercomputers, computing performances have been improved by employing multi-core CPU architectures, responding to demands for higher computation abilities. However, electrical data transmission between chips or boards is facing limits due to physical distances and it becomes difficult to catch up with high-speed computation. Silicon (Si) photonics technology is expected as an alternative technology that solves the problem of insufficient electric transmission capacity between high-rate data processors. Si photonics technology enables integration of Si-waveguide-based optical devices on a Si substrate. Especially, applications of wavelength division multiplexing (WDM), that has already been put into practical use in the telecommunications field, to Si photonics is expected as key technology for high-density transmission and reduction of fiber optical cable.

For Si photonics-based optical transmission equipment such as optical transmitters, optical receivers, optical switches, or optical routers, compound III-V semiconductors including GaAs-based or InP-based materials have been used in light sources, optical amplifiers, loss-compensation optical devices and so on because bulk Si has an indirect bandgap. It is difficult to monolithically integrate Si-waveguide-based devices and III-V semiconductor components on the same substrate due to lattice mismatch. Currently, hybrid integration to place compound semiconductor optical components onto a Si waveguide platform is a mainstream.

In hybrid integration, a structure for optically coupling the optical waveguide of a III-V compound semiconductor chip to a Si photonic waveguide formed on a Si platform by abutting connection at end faces is known. See, for example, Japanese Patent Application Laid-open Publication No. 2007-286340 (Patent Document 1). Another known structure is to provide evanescent coupling by placing a gain medium of III-V compound semiconductor in close proximity to a Si photonic waveguide on a Si platform. See, for example, S. Stankovic et al., "Hybrid III-V/Si Distributed-Feedback Laser Based on Adhesive Bonding", IEEE Photonics Tech. Lett., Vol. 24, No. 23, Dec. 1, 2012 (Non-patent Document 1). Evanescent-coupled devices cannot achieve sufficient characteristics because of large optical loss due to incompleteness of binding interfaces. As a modification of end-face coupling structures, a technique of mounting semiconductor optical amplifiers (SOAs) by flip-chip bonding onto solder bumps formed over a Si waveguide platform is proposed. See, for example, R. A. Budd et al., "Semiconductor Optical Amplifier (SOA) Packaging for Scalable and Gain-Integrated Si photonic Switching Platforms", 2015, Electronic Components & Technology Conference (Non-patent Document 2).

When assembling a semiconductor photonic chip on a Si photonic platform (which may be called simply as "Si platform"), it is desired to couple the optical waveguide of the semiconductor photonic chip to the Si photonic waveguide of the Si platform at low coupling loss. With an end-face coupling structure, the end face of the optical waveguide of the semiconductor photonic chip has to be brought into the right position so as to face and align with the end face of the Si photonic waveguide formed on the Si platform to provide sufficient optical coupling between them. When mounting a SOA chip on a Si platform by end-face coupling, typically the SOA chip is embedded in a recess opening formed on the Si platform, and the optical waveguides of the SOA chip and the Si photonic waveguides on the Si platform are optically connected to each other in a horizontal direction parallel to the Si platform surface. With this scheme, the alignment accuracies in the length, the width, and the height directions between two waveguides become factors for determining optical coupling loss. In order to achieve high optical gain in a SOA with input and output waveguides, low-loss optical coupling is demanded at both the input waveguide and the output waveguide. However, it is difficult to achieve high optical gain for several reasons described below.

An optical circuit structure in which a semiconductor photonic device is integrated with low coupling loss is desired.

SUMMARY

According to an aspect of the invention, an optical circuit module comprises a substrate with a first optical coupler connected to a first optical waveguide and a second optical coupler connected to a second optical waveguide on a substrate surface side, and a semiconductor photonic device mounted on the substrate, wherein the semiconductor photonic device has a third optical waveguide and a fourth optical waveguide extending to a first end face that faces the substrate surface, and wherein the third optical waveguide is optically connected to the first optical coupler and the fourth optical waveguide is optically connected to the second optical coupler.

The object and advantages of the invention will be realized and attained by means of the elements and combinations particularly pointed out in the claims.

It is to be understood that both the foregoing general description and the following detailed description are exemplary and explanatory and are not restrictive to the invention as claimed.

DESCRIPTION OF EMBODIMENTS

Prior to describing a semiconductor photonic device and a mounting structure for such, explanation is made to technical problems in the convention end-face coupling found by the inventor in more detail.

Figure 1A:
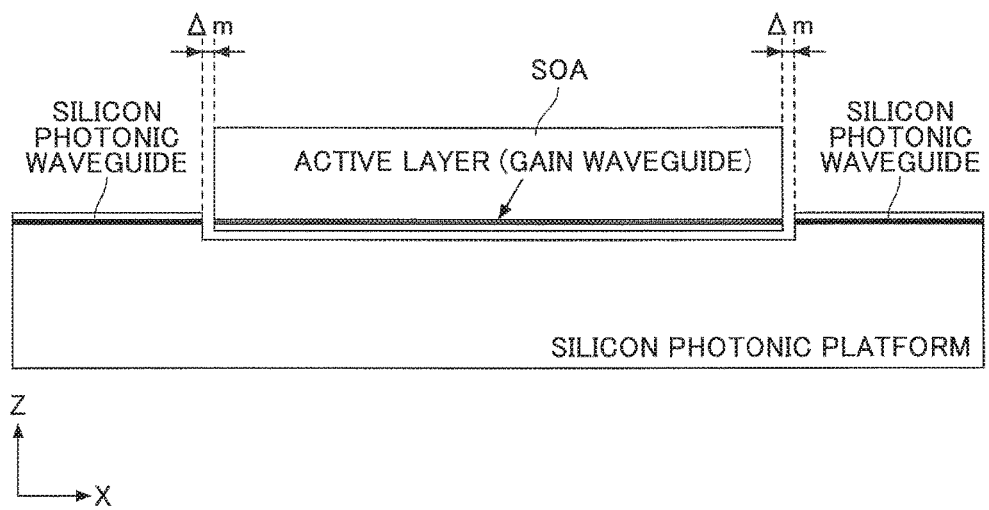
FIG. 1A illustrates in a X-Z plane a typical structure with a SOA chip integrated in a Si platform, for explaining a problem arising in the conventional end-face coupling.
Figure 1B:
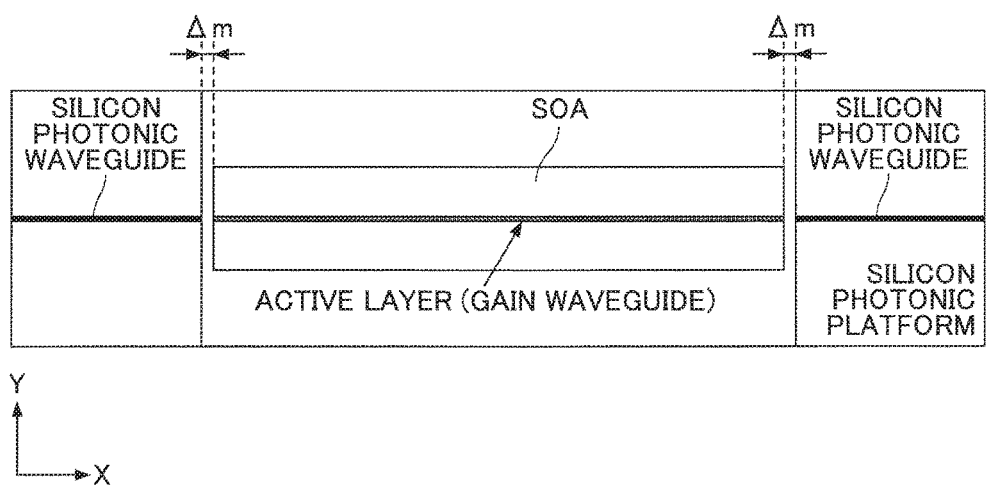
FIG. 1B illustrates in a X-Y plane the structure of FIG. 1A, for explaining a problem arising in the conventional end-face coupling.

FIG. 1A and FIG. 1B illustrate in X-Z and X-Y planes, respectively, a typical arrangement of a semiconductor optical amplifier (SOA) mounted on a Si photonic platform by end-face coupling. FIG. 1A is a cross-sectional view taken along the optical axis extending in the X direction, and FIG. 1B is a top view of the structure of FIG. 1A. The gain waveguide (or the active layer) of the SOA is optically coupled with Si photonic waveguides at both the input end and the output end. At both input and output ends of the SOA, low-loss coupling is desired. The SOA gain waveguide needs to be aligned with the Si photonic waveguides not only in the Z (or the height) and the Y (or the width) directions, but also in the X (or the optical axis) direction.

In general, a SOA is formed by separating a wafer into chips making use of crystal cleavage planes and the positional accuracy of cleaves is about ±5 μm. Taking the assembly yield into account, the recess opening of the Si photonic platform in which the SOA is to be placed is formed slightly longer than the designed length of the SOA with a margin of $\Delta m$ provided at each end. The margin is set to, for example, +5 μm at each end. Due to the margin, coupling loss occurs at both the input end and the output ends of the SOA and consequently, the net optical gain decreases. The variation in the SOA length in the X direction leads directly to coupling loss and thus, to variation in net optical gain.

Figure 2:
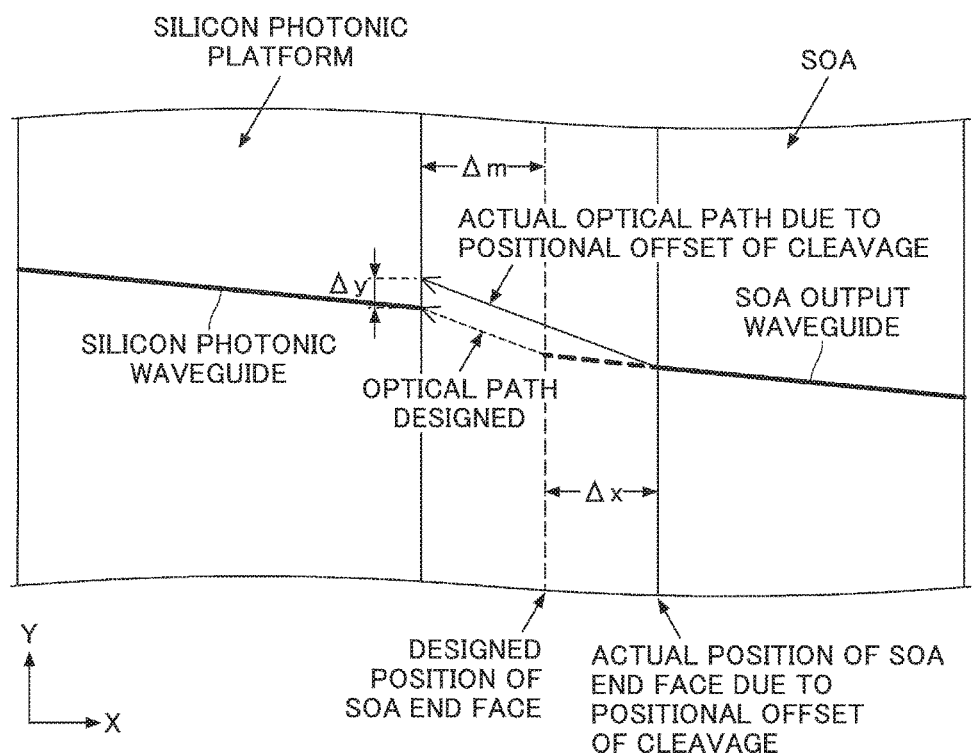
FIG. 2 is a diagram explaining another problem in the conventional structure of SOA integration by end-face coupling.

FIG. 2 is a diagram explaining another technical problem arising in the conventional end-face coupling. In a SOA, input and output waveguides may be formed obliquely at an angle of about 8 degrees with respect to the longitudinal axis of the chip to reduce reflection from the end faces of the input and output waveguides. With the oblique waveguide, positional offset $\Delta x$ in the X direction due to positional offset of the cleavage plane is converted into positional offset $\Delta y$ in the Y direction, as illustrated in FIG. 2. The variation in the SOA length due to positional offset of the cleavage plane also becomes positional offset in the Y direction, and accordingly, the coupling loss further increases.

Figure 3:
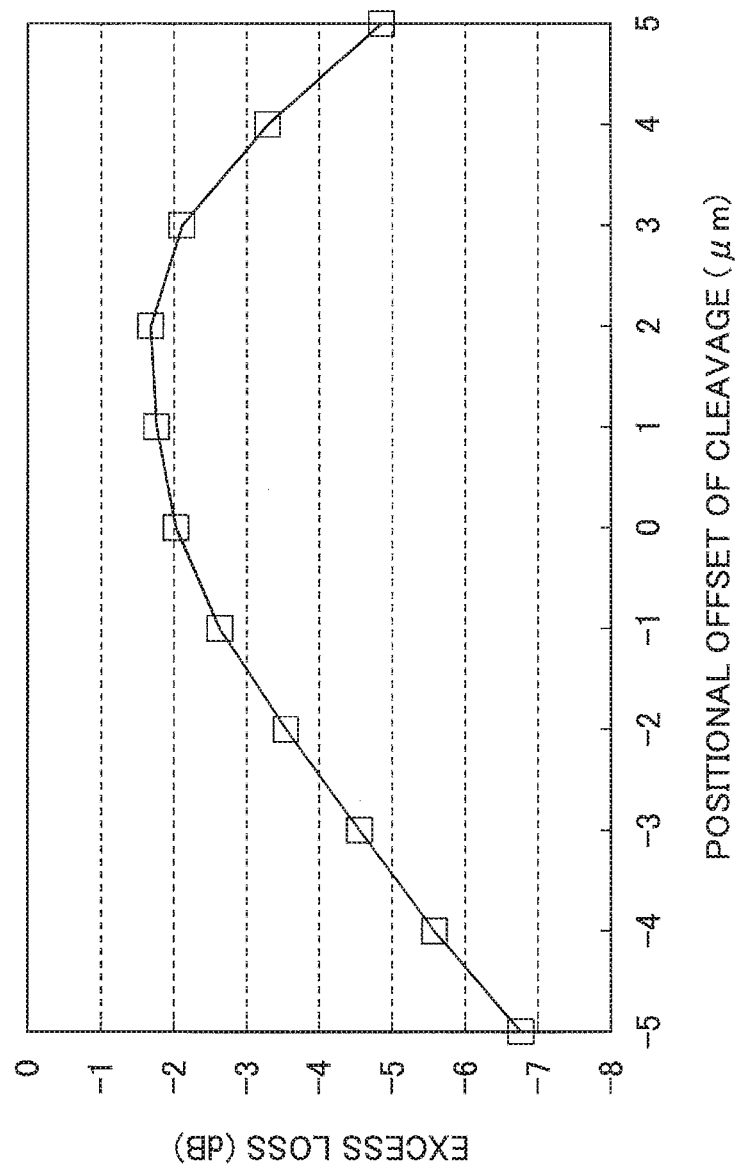
FIG. 3 is a diagram illustrating dependency of excess loss caused by misalignment in Y-direction on positional offset of cleavage.

FIG. 3 is a diagram illustrating excess loss caused by misalignment in Y-direction as a function of positional offset of the optical path of the oblique waveguide in the Y direction. It is assumed in this figure that the position of the cleavage plane varies in the range of ±5 μm. Simulation is made with the assumption that positional offset of cleavage occurs within the range of ±5 μm, and that the gap between the end face of the Si photonic waveguide and the end face of the SOA gain waveguide becomes 5 μm when the positional offset of cleavage is 0 μm (namely, when the chip length is the designed length) and the optical offset in Y-direction is zero. Under this assumption, the length of the SOA becomes a median or a central value of the chip length. It is also assumed that positional offset of cleavage planes occurs at both ends of the SOA by the same amount. Excess loss is calculated as a total loss at both ends. A negative sign of positional offset of cleavage indicates that the SOA chip length is shorter, and a positive sign of positional offset of cleavage indicates that the SOA chip length is longer than the right size. For example, with positional offset of +5 μm of the cleavage plane, the gap between the end face of the Si photonic waveguide and the end face of the SOA gain waveguide becomes 0 μm.

As is understood from FIG. 3, excess loss caused by misalignment in Y-direction depends on the amount of positional offset of cleavage, and it becomes the minimum when the offset is +2 μm. Although the device is designed such that the offset of the oblique waveguide in the Y direction becomes 0 μm when the positional offset of the cleavage is 0 μm (namely, when the gap between the two end faces is 5 μm), the excess loss does not become the minimum. This is because the excess loss itself has dependency in the X direction. For the same reason, the simulation result of FIG. 3 is asymmetric in the positive and negative directions. When the position of the cleavage plane shifts to the negative direction (with the gap between the Si photonic waveguide and the SOA waveguide increasing), optical loss due to separation in the X direction is added to the offset of the optical path in the Y direction. The simulation result of FIG. 3 implies that the optical loss can be reduced by bringing the end face of the SOA closer to the end face of the Si photonic device up to +2 μm cleavage offset even though a certain amount of offset occurs in the Y direction.

Figure 4:
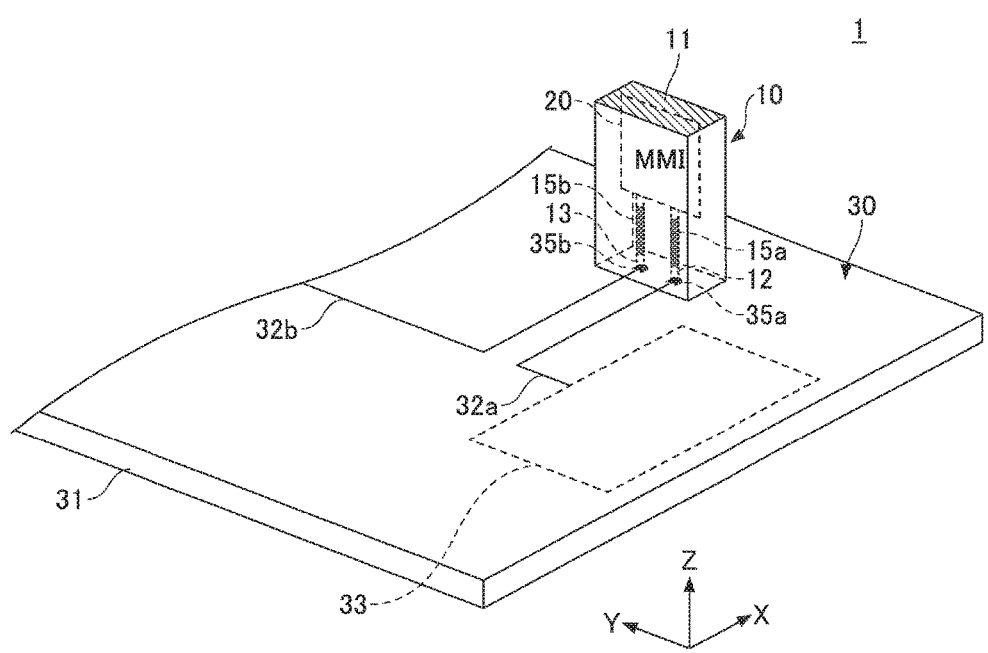
FIG. 4 is a schematic diagram illustrating an optical circuit module with a SOA chip mounted on a Si platform according to an embodiment.

FIG. 4 is a schematic diagram illustrating an optical circuit module 1 with an SOA 10 mounted on a substrate according to an embodiment, proposed in view of the above-explained technical problems. The SOA 10 is an example of semiconductor photonic device mounted on a photonic substrate. In this example, a Si photonic chip 30 with Si core waveguides is used as the photonic substrate; however, the invention is not limited to this example. The substrate may be a planar lightwave circuit (PLC) platform with waveguide core through a quartz substrate, or a hybrid optical circuit board in which PLC and Si photonics are combined.

The SOA 10 has an input optical waveguide 12 and an output optical waveguide 13 formed on the same side of the chip, extending to the same end face. The SOA 10 is mounted on the Si photonic chip 30 such that the input optical waveguide 12 and the output optical waveguide 13 are optically connected at the end face to the input/output interfaces of the Si photonic chip 30 from the direction vertical to the substrate surface of the Si photonic chip 30. The input/output interface on the Si photonic chip 30 is, for example, an optical grating coupler. In the example of FIG. 4, diffraction grating couplers 35a and 35b are provided. The structure in which input/output optical waveguides of a semiconductor photonic device such as the SOA 10 are connected vertical to the surface of the mounting substrate is named "vertical mounting" as a matter of convenience.

At least one of the input optical waveguide 12 and the output optical waveguide 13 of the SOA 10 extending toward the same end face contacting the Si photonic chip 30, is connected to a gain region. In FIG. 4, the input optical waveguide 12 and the output optical waveguide 13 are connected to the gain regions 15a and 15b, respectively. The SOA 10 has a MMI waveguide 20 inside it. The input optical waveguide 12 and the output optical waveguide 13 are connected to each other via the MMI waveguide 20. A high reflective coating 11 is formed on the other end face of the SOA 10, opposite to the input/output end of the MMI waveguide 20, thereby forming a reflective MMI coupler.

The Si photonic chip 30 has an optical circuit 33, optical waveguide 32a extending from the optical circuit 33 to the input end of the SOA 10, and an optical waveguide 32b extending from the output end of the SOA 10 to an optical interface formed over the Si substrate 31. Such optical interface may be connected to an external optical fiber. At the connecting part between the SOA 10 and the optical waveguides 32a and 32b (formed as Si photonic waveguides), diffraction grating couplers 35a and 35b are formed as light input/output interfaces.

With this structure, the SOA 10 is optically connected at the input end and the output end to the diffraction grating couplers 35a and 35b, respectively, with little gap between the surface of the Si photonic chip 30 and end face of the SOA 10. Unlike the conventional horizontal connection in a recess opening, a spatial gap due to variation in the SOA chip length caused by positional offset of cleavage plane can be diminished or eliminated. As has been explained above, a gap between the input/output waveguides of the SOA 10 and the optical waveguides of the Si photonic platform increases coupling loss. In the structure of the embodiment, the gap between the SOA 10 and the Si photonic chip 30 can be reduced as much as possible at the optical coupling side. Even if the input/output optical waveguides of the SOA 10 are formed obliquely, positional offset in the Y direction orthogonal to the optical axis of the Si photonic platform within the waveguide plane can be reduced.

Figure 5A:
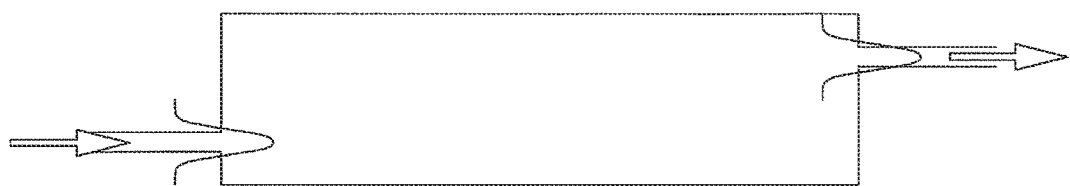
FIG. 5A is a diagram illustrating an multi-mode interferometer (MMI) waveguide.
Figure 5B:
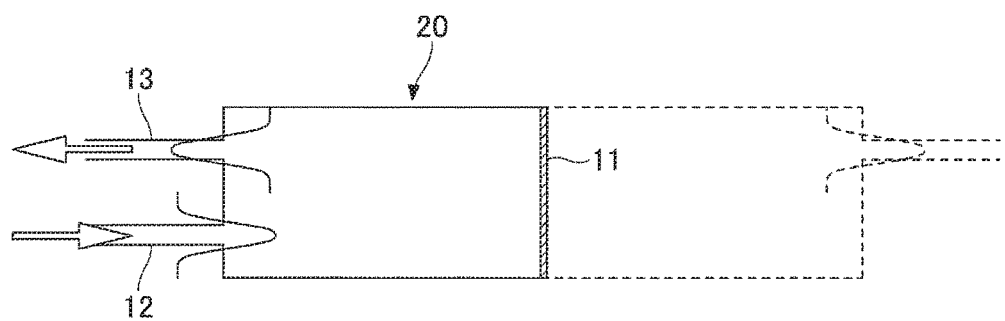
FIG. 5B is a diagram illustrating a reflective MMI waveguide.

FIG. 5A and FIG. 5B are diagram explaining 1×1 MMI waveguide incorporated in the SOA 10. "1×1" stands for one input and one output. The light input to the MMI waveguide propagates in multiple modes through the MMI waveguides, causing inter-mode interference. The position and/or the number of focal spots change depending on the width and the length of the MMI waveguide channel or the light incident position on the MMI waveguide.

By appropriately designing the width and the length of the MMI waveguide channel, the light incident to the input channel appears at the output channel arranged at the diagonal position as illustrated in FIG. 5A, and thus a 1×1 MMI waveguide is provided.

FIG. 5B illustrates a 1×1 reflective MMI waveguide 20 used in the embodiment. By providing a high reflective coating at the middle of the MMI waveguide of FIG. 5A, a mirror image is formed at a line-symmetric position of the input optical waveguide 12 as illustrated in FIG. 5B. The MMI waveguide with a reflective coating applied at one end is called a "reflective MMI waveguide" in this specification.

Figure 6:
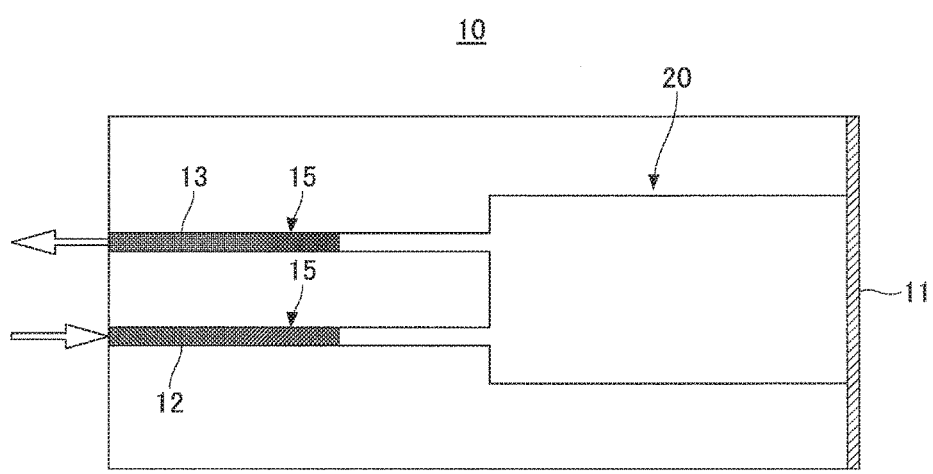
FIG. 6 is a schematic diagram illustrating a SOA with a reflective MMI waveguide according to an embodiment.

FIG. 6 illustrates a SOA 10 with a reflective MMI waveguide 20 inside it. Light travelling through the input optical waveguide 12 of the SOA 10 is coupled to the output optical waveguide 13 via the MMI waveguide 20 with a high reflective coating 11. The propagation direction of signal light is rotated by 180 degrees in the SOA 10. By providing a gain region 15 to at least one of the input optical waveguide 12 and the output optical waveguide 13 connected to the reflective MMI waveguide 20, the SOA 10 with the input and output ends of the optical waveguides located at the same end face can be acquired. The input optical waveguide 12 and the output optical waveguide 13 may be oblique waveguides to reduce return light reflected from the end face of the SOA 10.

Since the SOA 10 is cut along a cleavage plane, excess loss may occur due to positional offset of the cleavage plane. Assuming that the end face in which the input and output end of the input optical waveguide 12 and the output optical waveguide 13 are located is the first end face, optical loss due to positional offset of the cleavage plane may include (1) a first optical loss due to positional shift of the second end face (provided with the high reflective coating 11 of the MMI waveguide 20) opposite to the first end face, and (2) a second optical loss due to offset in the Y direction caused by the positional offset of cleavage plane at the first end face when employing oblique waveguides as the input optical waveguide 12 and the output optical waveguide 13 of the SOA 10.

Concerning the first optical loss, the positional shift of the high reflective coating 11 of the MMI waveguide 20 formed on the second end face of the SOA 10 results in variation in the length of the MMI waveguide 20, and accordingly, it appears as an optical coupling loss between the input optical waveguide and the output optical waveguide. When the high reflective coating 11 of the reflective MMI waveguide 20 is formed on the cleavage plane, positional offset or variation in position of the cleavage plane may cause a coupling loss.

Figure 7:
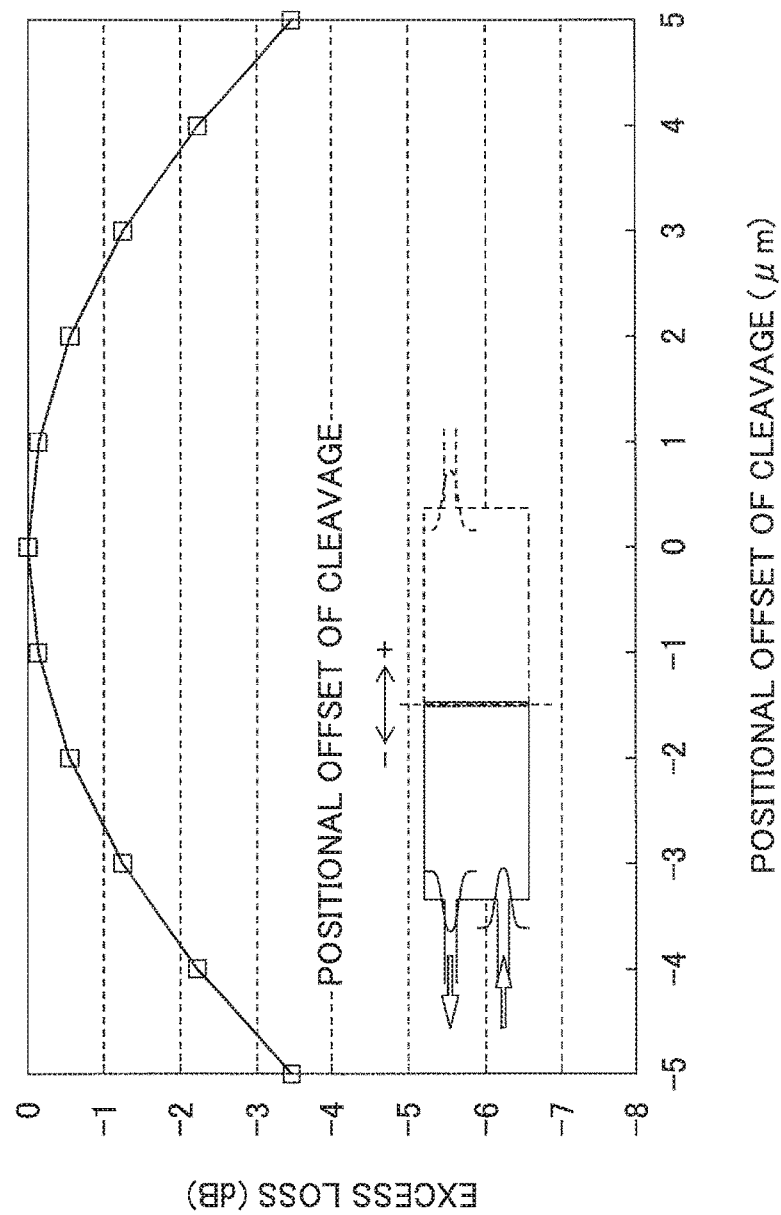
FIG. 7 is a diagram illustrating dependency of excess loss caused by misalignment in Y-direction on positional offset of cleavage in a 1×1 reflective MMI waveguide.

FIG. 7 illustrates a characteristic of optical loss between the input and output optical waveguides of the reflective MMI waveguide 20 depending on positional offset of cleavage plane. From FIG. 7, the maximum 3.5 dB optical loss occurs within the range between plus and minus 5 μm of positional offset of cleavage. However, as is clear from the comparison with FIG. 3, the optical loss due to positional offset of cleavage in the SOA 10 of the embodiment is reduced compared with the conventional end-face coupling of SOA from the horizontal direction.

Concerning the second optical loss caused by oblique waveguides in the conventional structure, such optical loss is minimal in the structure of the embodiment because the input optical waveguide 12 and the output optical waveguide 13 of the SOA 10 are connected to the diffraction grating couplers 35a and 35b of the Si photonic chip 30 from the vertical direction to the substrate surface of the Si photonic chip 30. The gap between the diffraction grating couplers 35a and the end face of the SOA 10, and the gap between the diffraction grating coupler 35b and the end face of the SOA 10 are almost zero. In the end face of the SOA 10 are located the input end of the optical waveguide 12 and the output end of the output optical waveguide 13.

Figure 8:
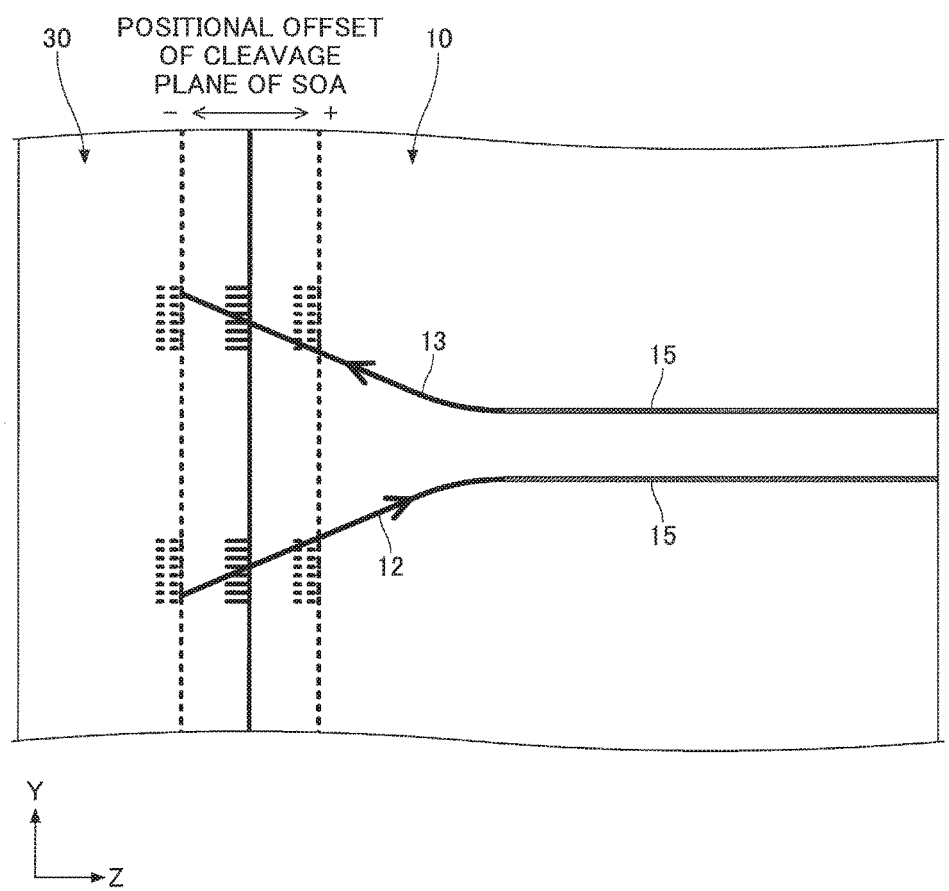
FIG. 8 is a diagram explaining offset of the coupling position of an oblique waveguide of an SOA due to positional offset of the cleavage plane.

Referring to FIG. 8, when the input optical waveguide 12 and the output optical waveguide 13 of the SOA 10 are formed obliquely, positional shift of the first end face (in which the input and output ends of the input optical waveguide 12 and the output optical waveguide 13 are located) may induce slight positional offset in the Y direction at the end face of the SOA 10, and thus a certain amount of optical loss may occur. However, because the gap in the abutting connection in the Z direction (vertical to the mounting surface) which may be caused by positional offset of the cleavage plane is the minimum, influence of the positional offset of cleavage is less than in the conventional end-face coupling of SOA from the horizontal direction.

Figure 9:
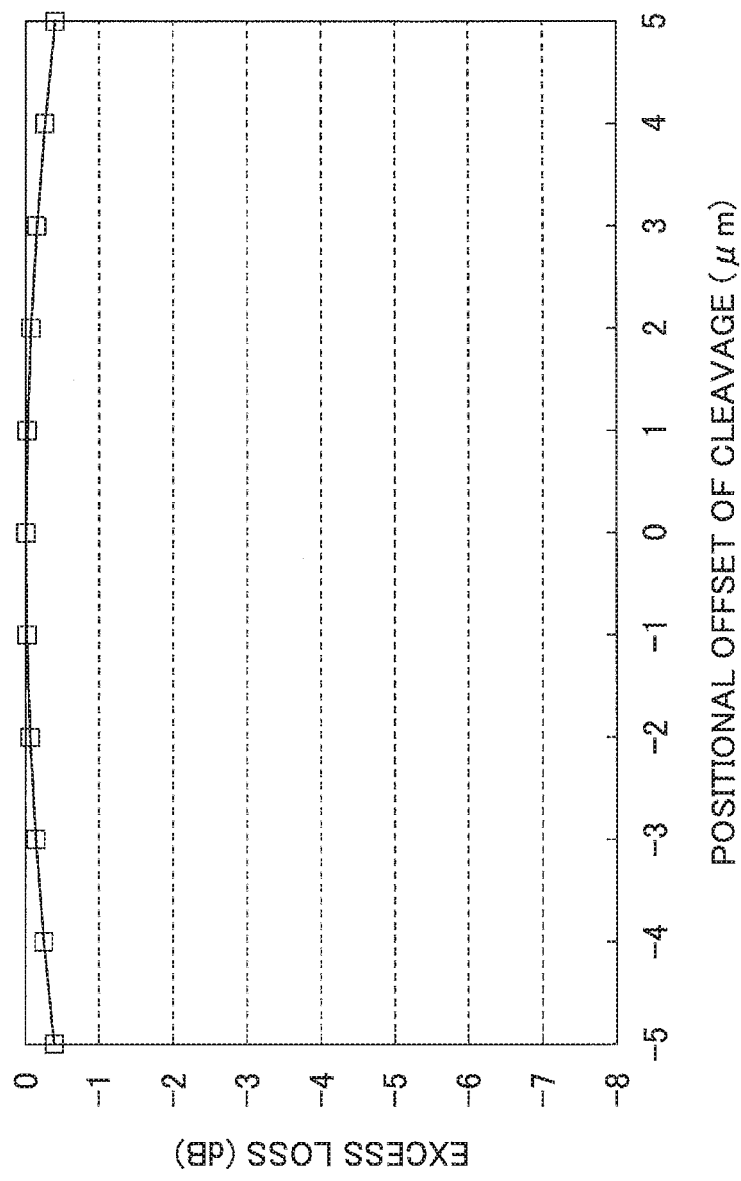
FIG. 9 is a diagram illustrating dependency of excess loss caused by misalignment in Y-direction on positional offset of cleavage in an oblique waveguide according to an embodiment.

FIG. 9 illustrates excess loss of the SOA 10 of the embodiment as a function of positional offset of cleavage plane when the input and output optical waveguides are formed as oblique waveguides. Excess loss due to positional offset of cleavage occurs at +5 μm and −5 μm; however, the loss is as small as 0.4 dB.

Figure 10:
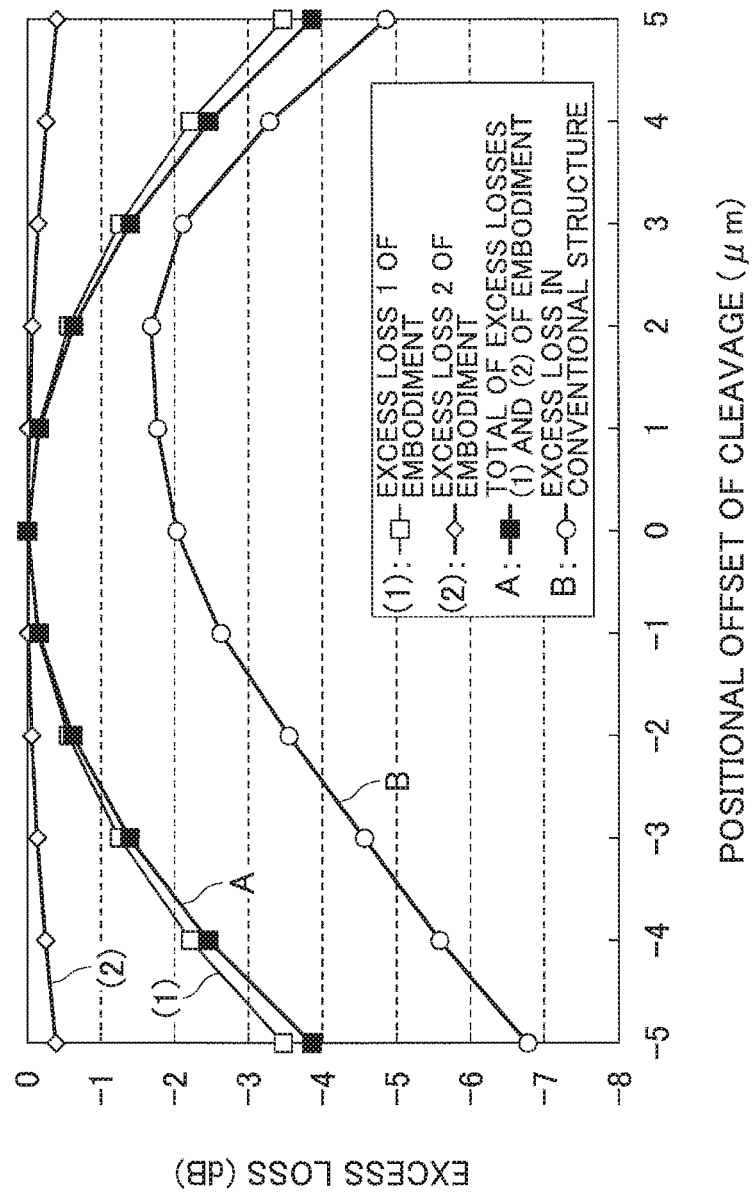
FIG. 10 is a diagram illustrating a comparison result of dependency of excess loss on positional offset of cleavage.

FIG. 10 is a diagram illustrating excess loss A of the embodiment compared to excess loss B of the conventional structure. The excess loss A of the embodiment is the total of the first optical loss illustrated in FIG. 7 and the second optical loss illustrated in FIG. 9 due to oblique waveguides. It is understood from FIG. 7, FIG. 9 and FIG. 10 that although a certain degree of optical loss occurs due to positional offset of cleavage plane in the fabrication process of the SOA 10, influence of the optical loss is small.

Especially, one of the features of the abutting connection from the vertical direction according to the embodiment is that the excess loss as a function of positional offset of cleavage is symmetric, and that the excess loss becomes the minimum at ±0 μm which is the mode (most frequently occurring value) with the cleavage accuracy of ±5 μm.

First Embodiment

Figure 11A:
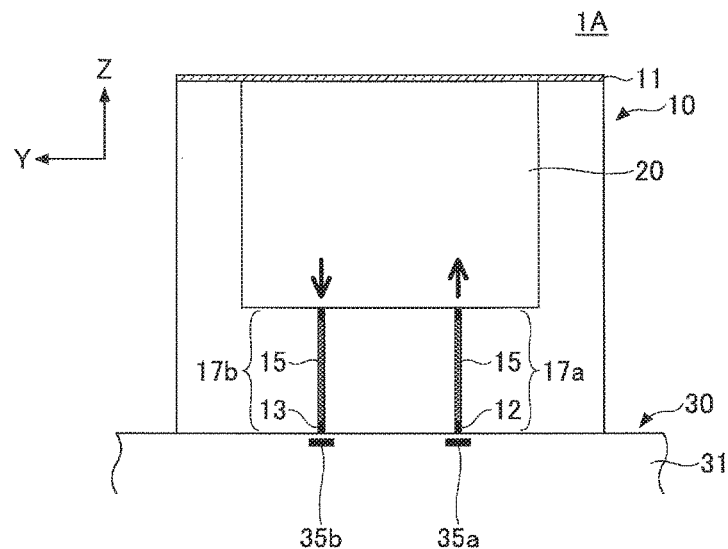
FIG. 11A illustrates in a Y-Z plane a SOA mounted on a Si platform according to the first embodiment.
Figure 11B:
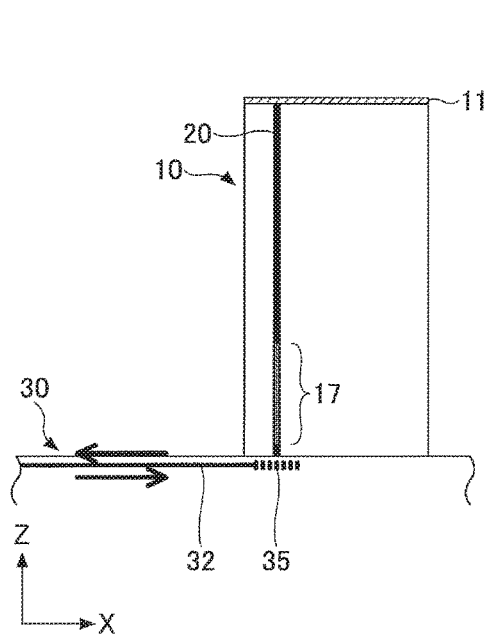
FIG. 11B illustrates in a X-Z plane the SOA mounted on the Si platform according to the first embodiment.
Figure 11C:
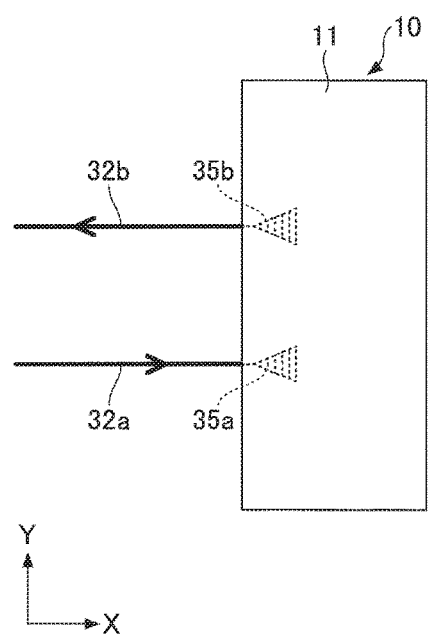
FIG. 11C illustrates in a X-Y plane the SOA mounted on the Si platform according to the first embodiment.

FIG. 11A through FIG. 11C are schematic diagrams of an optical circuit module 1A with the SOA 10 mounted according to the first embodiment. The SOA 10 is mounted vertically onto the Si photonic chip 30 in which optical waveguides and diffraction grating couplers 35 are fabricated. FIG. 11A is a front view of the SOA 10 in the Y-Z plane, FIG. 11B is a side view in X-Z plane, and FIG. 11C is a top view in the X-Y plane.

At and near the end face of the SOA 10 facing the Si photonics chip 30, an input optical waveguide 12, a gain region 15 connected to the input optical waveguide 12, an output optical waveguide 13, and another gain region 15 connected to the output optical waveguide 13 are formed. The input optical waveguide 12 and the associated gain region 15 form an input gain waveguide 17a. The output optical waveguide 13 and the associated gain region 15 form an output gain waveguide 17b. The input gain waveguide 17a and the output gain waveguide 17b may be named collectively as "input/output gain waveguides 17".

The input gain waveguide 17a and the output gain waveguide 17b are connected to the reflective MMI waveguide 20 in the SOA 10. At the opposite end of the reflective MMI waveguide 20 is formed a high reflective coating 11. The light input to the reflective MMI waveguide 20 is reflected from the high reflective coating 11 and focused on an imaging point at the output gain waveguide 17b. In the first embodiment, the input gain waveguide 17a and the output gain waveguide 17b are formed parallel to each other and parallel to the center axis of the SOA 10. With the SOA 10 mounted on the Si photonic chip 30, the input gain waveguide 17a and the output gain waveguide 17b extend within a plane perpendicular to the substrate surface of the Si photonic chip 30, and connected to the diffraction grating couplers 35a and 35b, respectively, from the vertical direction.

Figure 12A:
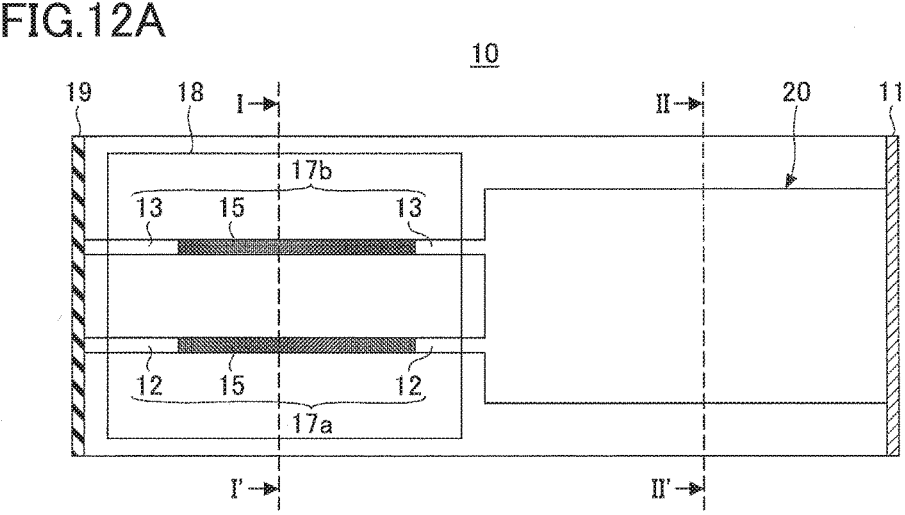
FIG. 12A is a schematic diagram of an SOA chip according to an embodiment.
Figure 12B:
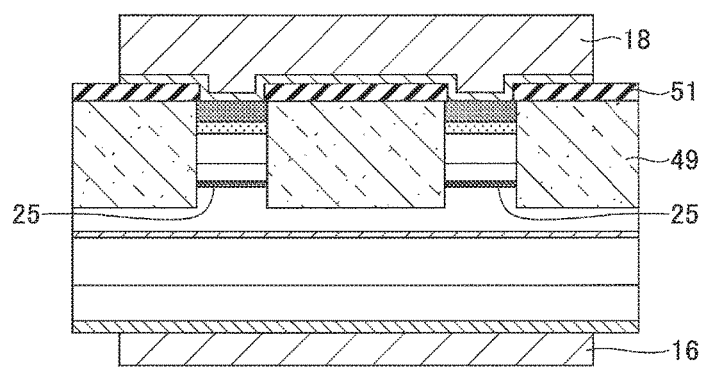
FIG. 12B is a cross-sectional view taken along the I-I' line of FIG. 12A.
Figure 12C:
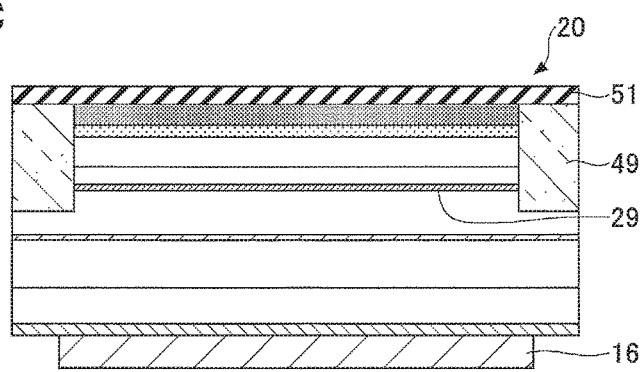
FIG. 12C is a cross-sectional view taken along the line of FIG. 12A.

This arrangement can achieve low-loss optical coupling. In order to further improve the high-efficient optical coupling in the vertical mounting structure, a mirror structure may be employed in the Si photonic chip 30 together with or in place of the diffraction grating couplers 35a and 35b FIG. 12A through FIG. 12C are diagrams of the SOA 10. FIG. 12A is a top view of the SOA 10 before it is mounted onto the Si platform, in which the top view corresponds to the front view of FIG. 11A mounted in the optical circuit module 1A. FIG. 12B is a cross-sectional view taken along the I-I' line of FIG. 12A, and FIG. 12C is a cross-sectional view taken along the II-II' line of FIG. 12A.

The input optical waveguide 12 and the output optical waveguide 13 are formed on one side of the SOA 10 extending toward one end face, and the high reflective coating 11 is formed in the opposite end face of the SOA 10. An antireflective coating 19 is formed on the end face of the light input/output side. The input optical waveguide 12 and the output optical waveguide 13 are connected to the gain regions 15 and thus the input gain waveguide 17a and the output gain waveguide 17b are formed.

The gain regions 15 of the input/output gain waveguides 17 are formed of active layers 25 (FIG. 12B). The MMI waveguide 20 is formed of an optical waveguide layer 29 (FIG. 12C). The waveguide region including the input and output gain waveguides 17a and 17b and the MMI waveguide 20 has a mesa structure, and the mesa structure is buried in a semi insulating compound semiconductor layer 49. The surface of the SOA 10 is covered with a protective layer 51 made of, for example SiO2, except for areas for electrical contact.

An electrode 18 is formed on the top face in an area covering the gain regions 15 as illustrated in FIG. 12A and FIG. 12B. An electrode 16 is formed on bottom face opposite to the electrode 18 as illustrated in FIG. 12B and FIG. 12C. The electrodes 16 and 18 are omitted in FIG. 4 and FIG. 11 for simplification of the illustration.

FIG. 13A through FIG. 27 are diagrams illustrating a fabrication process of the SOA 10 according to the first embodiment. The SOA 10 is formed of III-V compound semiconductor material, such as InP-based semiconductor, on a wafer. For the purpose of simplification of drawings, only one chip area on the wafer is illustrated. The steps, materials, conditions described below are only examples and many other modifications or alterations are available as long as the input optical waveguide 12 and the output optical waveguide 13 are formed on the same side extending from the same end face of the SOA 10.

Figure 13A:
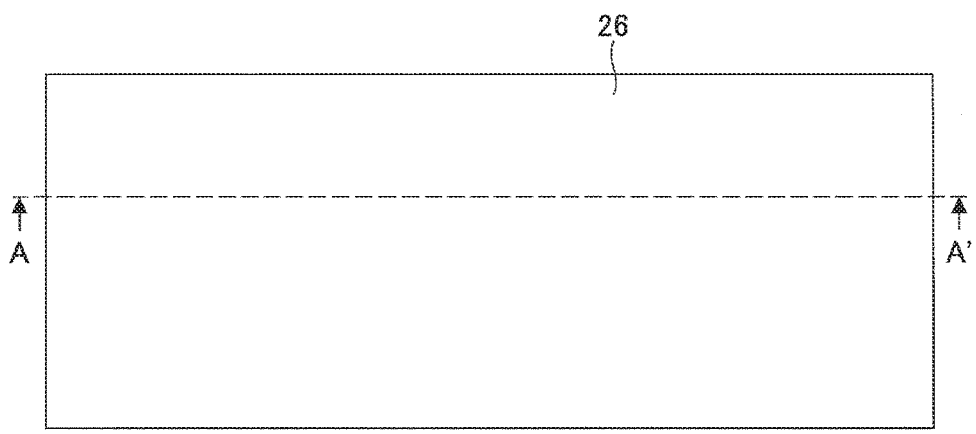
FIG. 13A illustrates a fabrication process of a SOA chip in a top view.
Figure 13B:
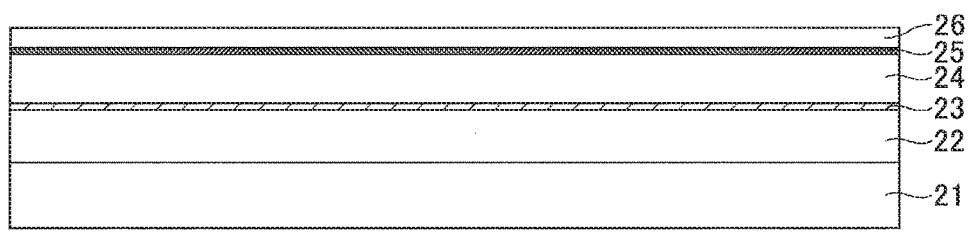
FIG. 13B illustrates a fabrication process of the SOA chip in a cross-sectional view taken along the A-A' line of FIG. 13A.

In FIG. 13A (top view) and FIG. 13B (cross-sectional view taken along the A-A' line of FIG. 13A), a buffer layer 22 of n-type InP with a thickness of 1 μm is grown over an n-type InP substrate 21. Then an etching stopper layer 23 of an n-type quaternary (four-element) compound with a thickness of 30 nm is formed over the buffer layer 22. The etching stopper layer 23 is, for example, InGaAsP with photoluminescence (PL) wavelength of 1.15 μm. A first cladding layer 24, an active layer 25, and a second cladding layer 16 are formed in this order over the etching stopper layer 23 by, for example, metal organic chemical vapor deposition (MOCVD). The first cladding layer 24 is, for example, an n-type InP layer with a thickness of 1 μm. The second cladding layer 26 is, for example, a p-type InP layer with a thickness of 0.2 μm. The active layer 25 inserted between the n-type InP and the p-type InP is formed of strained InGaAsP multi-quantum well (MQW) including InGaAsP separated confinement hetero-structure (SCH). For example, the thickness of the well layer and the barrier layer of the MQW are 5 nm and 10 nm, respectively, and the PL wavelength is 1.58 µm.

Figure 14A:
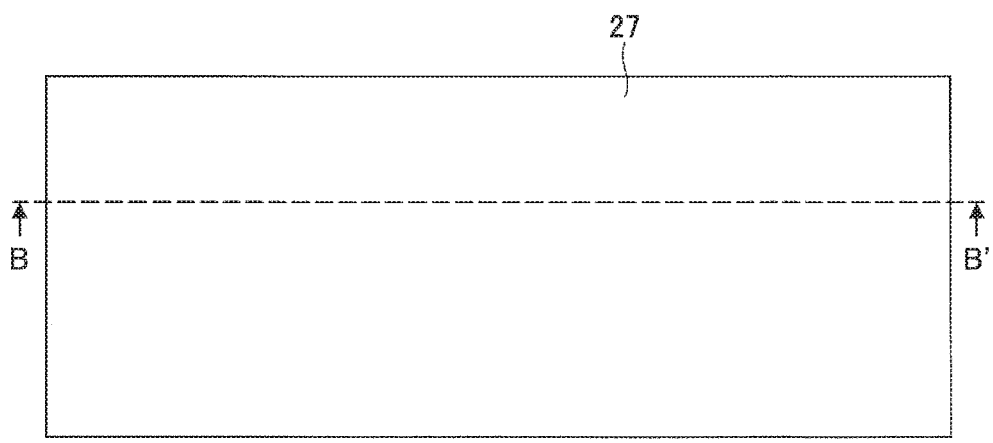
FIG. 14A illustrates a fabrication process of the SOA chip in a top view.
Figure 14B:
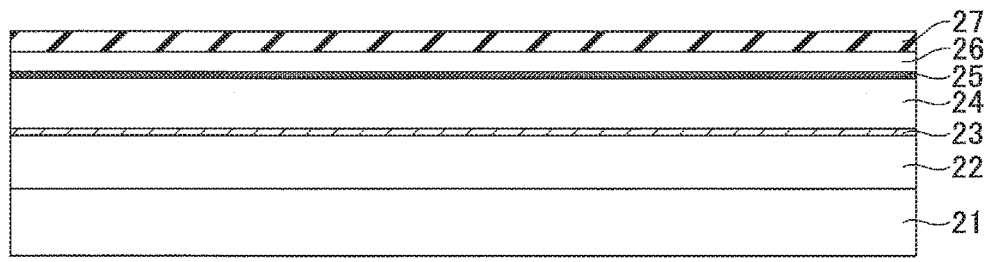
FIG. 14B illustrates a fabrication process of the SOA chip in a cross-sectional view taken along the B-B' line of FIG. 14A.

In FIG. 14A (top view) and FIG. 14B (cross-sectional view taken along the B-B' line of FIG. 14A), a SiO2 layer 27 with a thickness of 300 nm is formed over the entire surface by plasma CVD, for example.

Figure 15A:
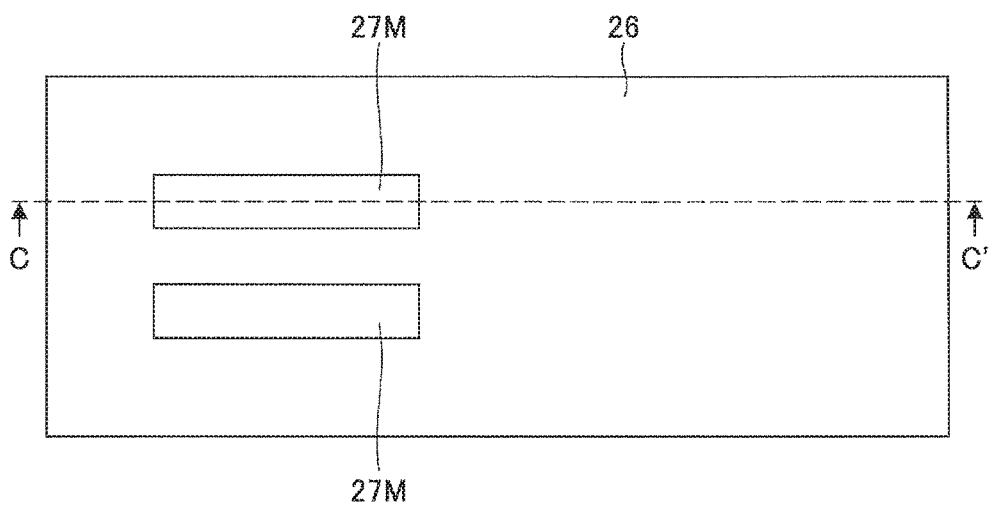
FIG. 15A illustrates a fabrication process of a SOA chip in a top view.
Figure 15B:
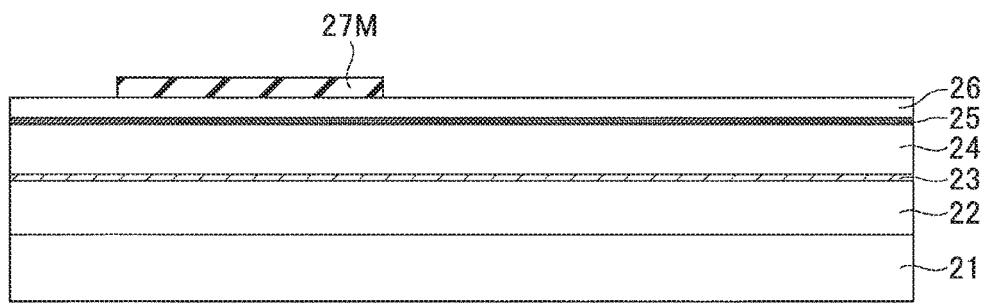
FIG. 15B illustrates a fabrication process of the SOA chip in a cross-sectional view taken along the C-C' line of FIG. 15A.

In FIG. 15A (top view) and FIG. 15B (cross-sectional view taken along the C-C' line of FIG. 15A), the entire surface is coated with a photoresist. Then exposure and development are performed to form resist masks covering the SOA gain regions. The SiO2 layer 27 is removed by wet etching from the area not covered with the resist masks to form SiO2 masks 27M.

Figure 16A:
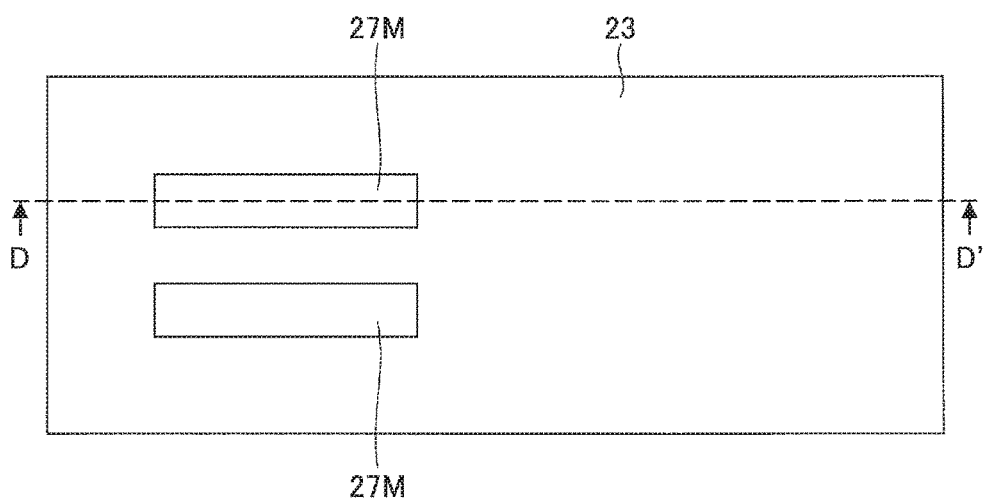
FIG. 16A illustrates a fabrication process of a SOA chip in a top view.
Figure 16B:
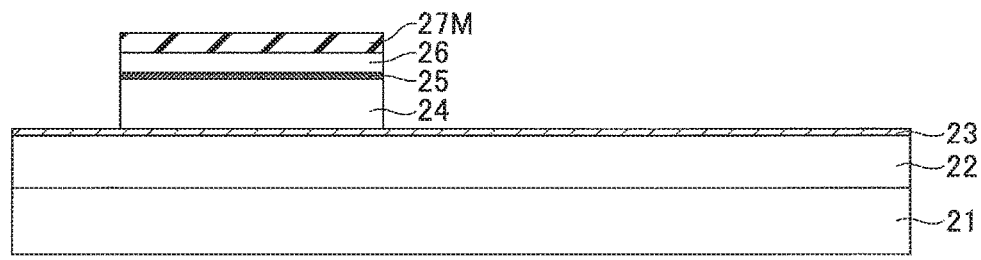
FIG. 16B illustrates a fabrication process of the SOA chip in a cross-sectional view taken along the D-D' line of FIG. 16A.

In FIG. 16A (top view) and FIG. 16B (cross-sectional view taken along the D-D' line of FIG. 16A), the sections of the second cladding layer 26, the active layer 25, and the first cladding layer 24 without cover from the SiO2 masks 27M are removed by wet etching, except for the gain regions. Because of the etch rate difference between the n-type InP of the first cladding layer 24 and the quaternary etching stopper layer 23, the etching stops at the etching stopper layer 23.

Figure 17A:
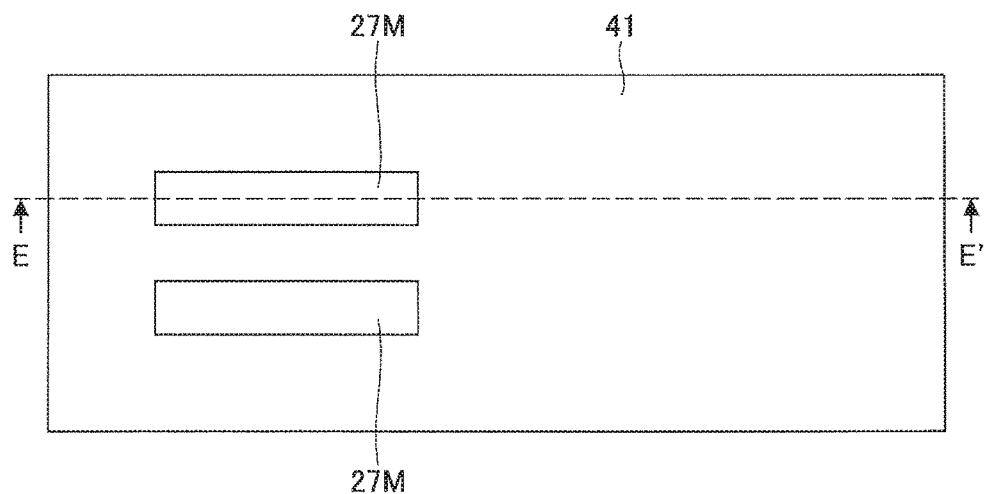
FIG. 17A illustrates a fabrication process of a SOA chip in a top view.
Figure 17B:
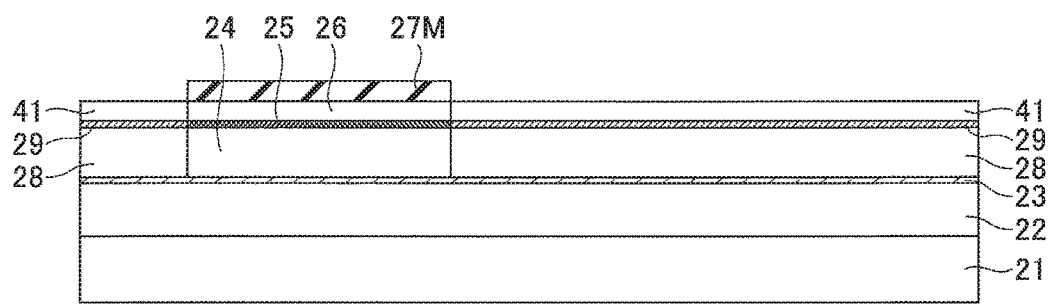
FIG. 17B illustrates a fabrication process of the SOA chip in a cross-sectional view taken along the E-E' line of FIG. 17A.

In FIG. 17A (top view) and FIG. 17B (cross-sectional view taken along the E-E' line of FIG. 17A), with the SiO2 masks 27M maintained, a first cladding layer 28, an optical waveguide layer 29, and a second cladding layer 41 are newly formed in this order by MOCVD in the area from which the first cladding layer 24, the active layer 25 and the second cladding layer 26 have been removed. The first cladding layer 28 is an n-type InP layer with a thickness of 1 µm, like the first cladding layer 24. The second cladding layer 41 is a p-type InP layer with a thickness of 0.2 µm, like the second cladding layer 26. The optical waveguide layer 29 is formed of InGaAsP with a thickness of 200 nm and its PL wavelength is 1.40 µm.

Figure 18A:
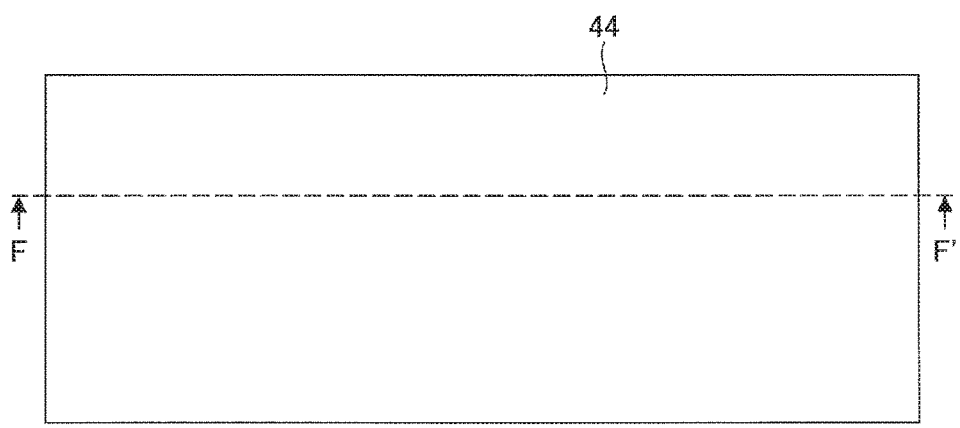
FIG. 18A illustrates a fabrication process of a SOA chip in a top view.
Figure 18B:
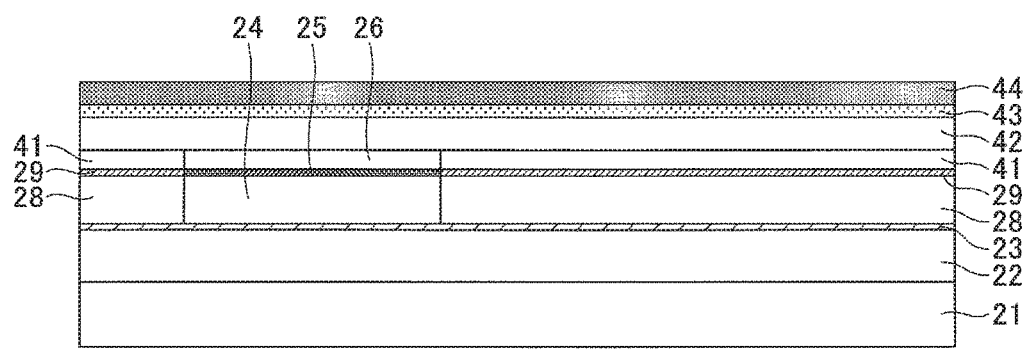
FIG. 18B illustrates a fabrication process of the SOA chip in a cross-sectional view taken along the F-F' line of FIG. 18A.

In FIG. 18A (top view) and FIG. 18B (cross-sectional view taken along the F-F' line of FIG. 18A), the SiO2 masks 27M are removed by wet etching or any other suitable method. Then, a third cladding layer 42, a quaternary compound contact layer 43 and a ternary compound contact layer 44 are formed in this order by, for example, MOCVD. The third cladding layer 42 is a p-type InP layer with a thickness of 1.5 µm. The quaternary compound contact layer 43 is a p-type InGaAsP layer with a thickness of 0.15 µm. The ternary compound contact layer 44 is a p-type InGaAs layer with a thickness of 0.3 µm.

Figure 19A:
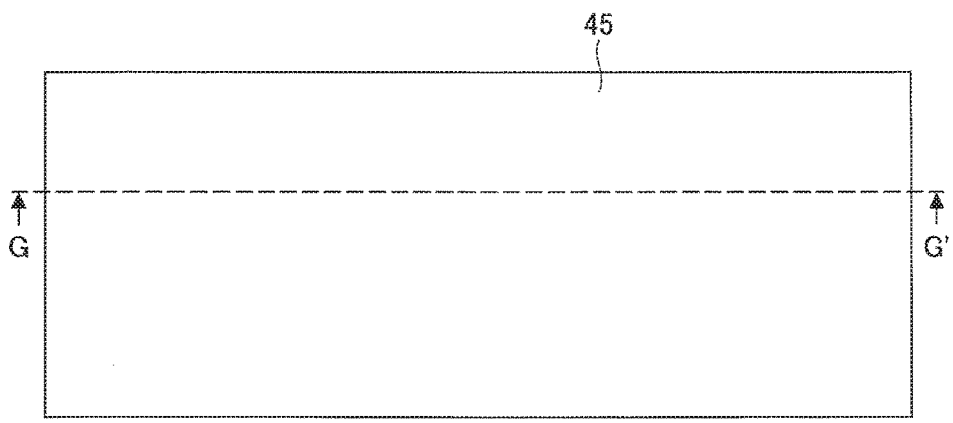
FIG. 19A illustrates a fabrication process of a SOA chip in a top view.
Figure 19B:
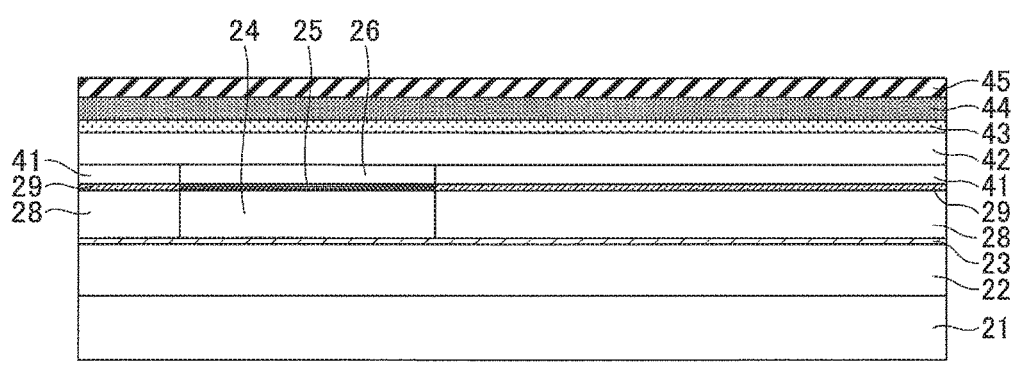
FIG. 19B illustrates a fabrication process of the SOA chip in a cross-sectional view taken along the G-G' line of FIG. 19A.

In FIG. 19A (top view) and FIG. 19B (cross-sectional view taken along the G-G' line of FIG. 19A), a SiO2 layer 45 with a thickness of 300 nm is formed by plasma CVD or any other suitable method over the entire surface. The SiO2 layer 45 is used to form a mask for fabricating a mesa structure including optical waveguides, gain regions and a MMI waveguide.

Figure 20A:
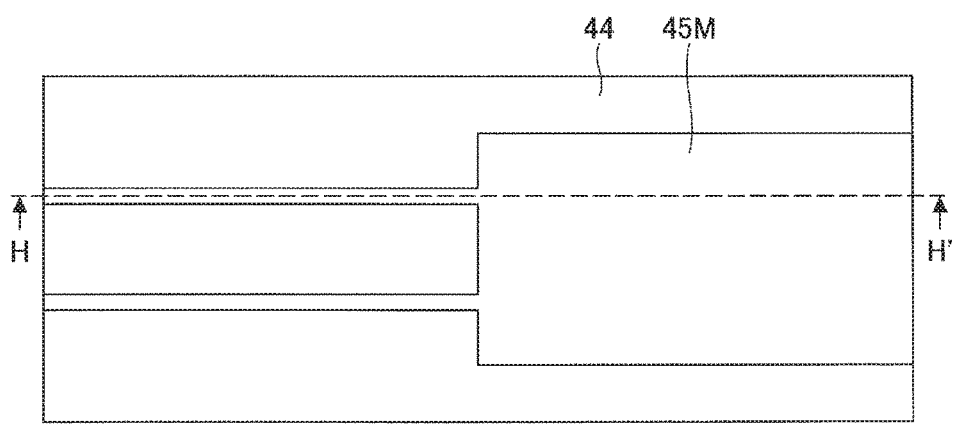
FIG. 20A illustrates a fabrication process of the SOA chip in a top view.
Figure 20B:
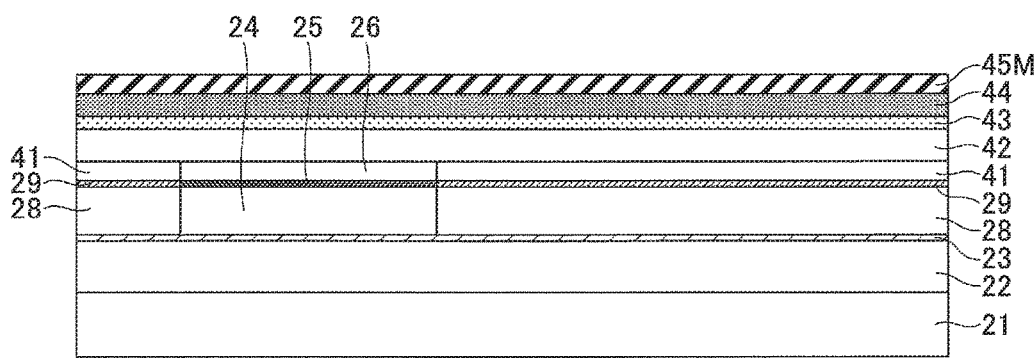
FIG. 20B illustrates a fabrication process of the SOA chip in a cross-sectional view taken along the H-H' line of FIG. 20A.

In FIG. 20A (top view) and FIG. 20B (cross-sectional view taken along the H-H' line of FIG. 20A), the entire surface is coated with a photoresist, and exposure and development are performed to form a resist mask in a shape of optical waveguides, gain regions, and MMI waveguide. Then, the SiO2 layer 45 not covered with the resist mask is removed by wet etching to form SiO2 masks 45M.

Figure 21A:
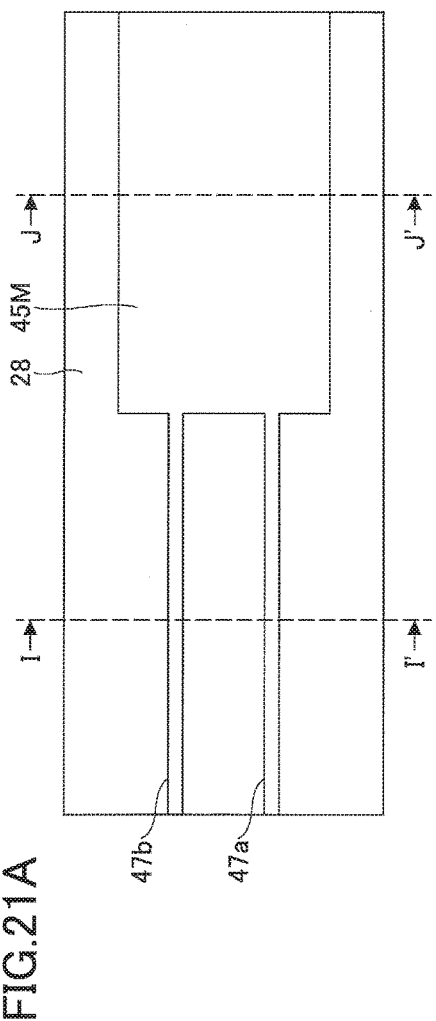
FIG. 21A illustrates a fabrication process of a SOA chip in a top view.
Figure 21C:
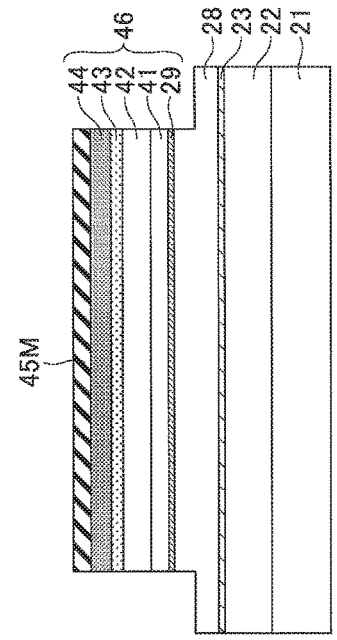
FIG. 21C illustrates a fabrication process of the SOA chip in a cross-sectional view taken along the J-J' line of FIG. 21A.
Figure 21B:
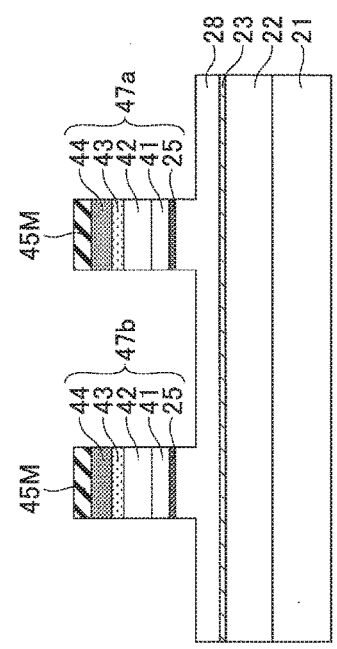
FIG. 21B illustrates a fabrication process of the SOA chip in a cross-sectional view taken along the I-I' line of FIG. 21A.

In FIG. 21A (top view), FIG. 21B (cross-sectional view taken along the I-I' line of FIG. 21A) and FIG. 21C (cross-sectional view taken along the J-J' line of FIG. 21A), a mesa 46 for MMI region and mesas 47a and 47b for input/output optical waveguides are formed by, for example, inductively coupled plasma reactive ion etching (ICP-RIE). The height of the mesas 46, 47a and 47b is about 3 µm.

Figure 22A:
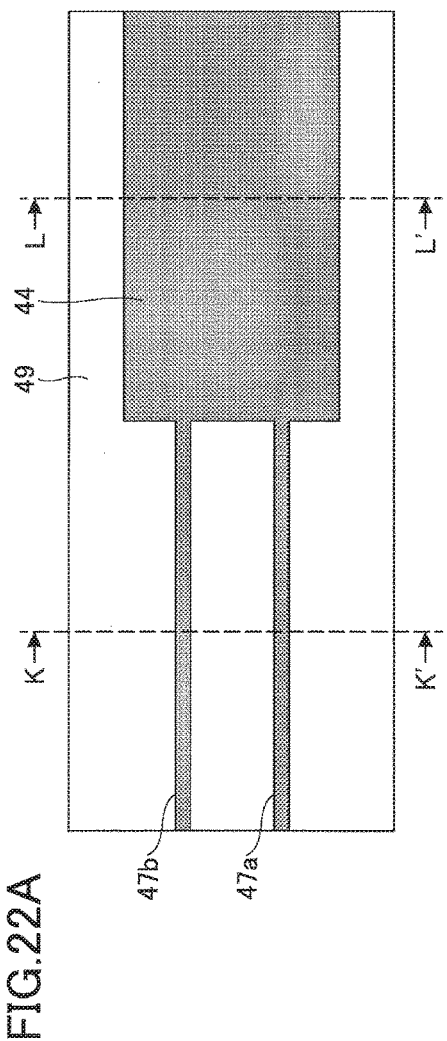
FIG. 22A illustrates a fabrication process of a SOA chip in a top view.
Figure 22C:
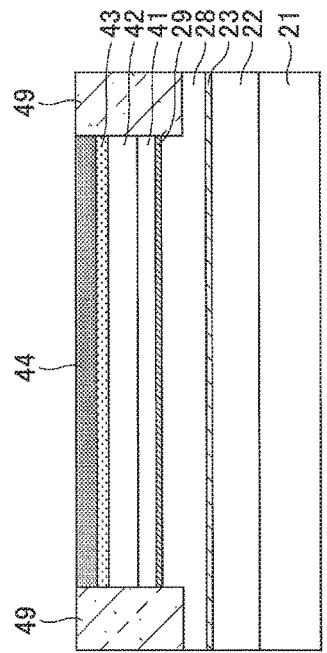
FIG. 22C illustrates a fabrication process of the SOA chip in a cross-sectional view taken along the L-L' line of FIG. 22A.
Figure 22B:
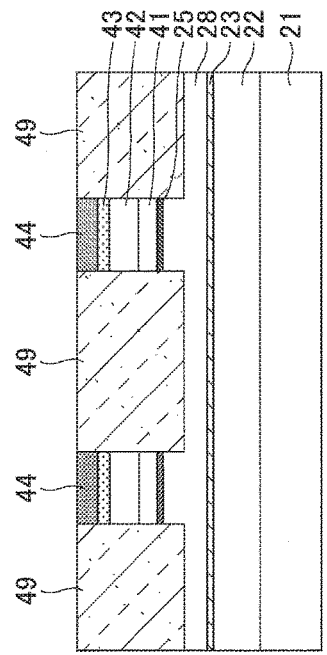
FIG. 22B illustrates a fabrication process of the SOA chip in a cross-sectional view taken along the K-K' line of FIG. 22A.

In FIG. 22A (top view), FIG. 22B (cross-sectional view taken along the K-K' line of FIG. 22A) and FIG. 22C (cross-sectional view taken along the L-L' line of FIG. 22A), a semi-insulating InP layer 49 is grown up to 3-µm thickness to embed the mesas 46, 47a and 47b. At this stage of time, crystal growth is completed. Then, the SiO2 mask 45M is removed by, for example, wet etching.

Figure 23A:
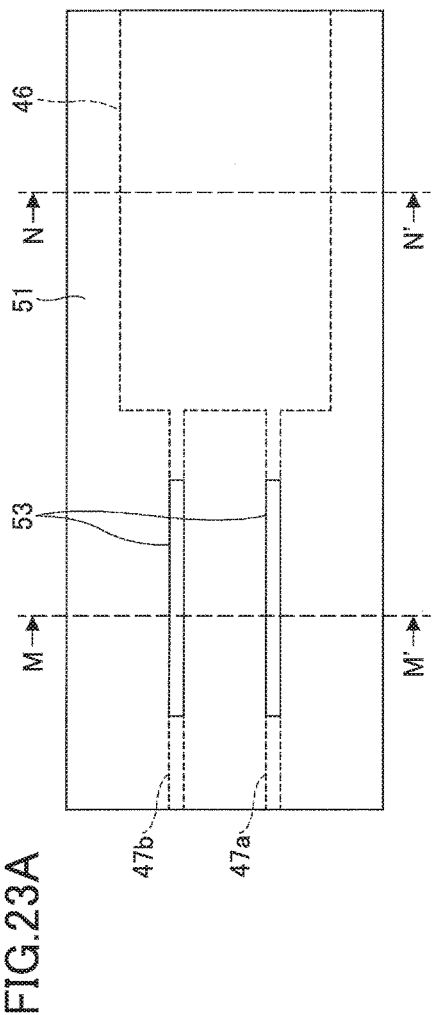
FIG. 23A illustrates a fabrication process of a SOA chip in a top view.
Figure 23C:
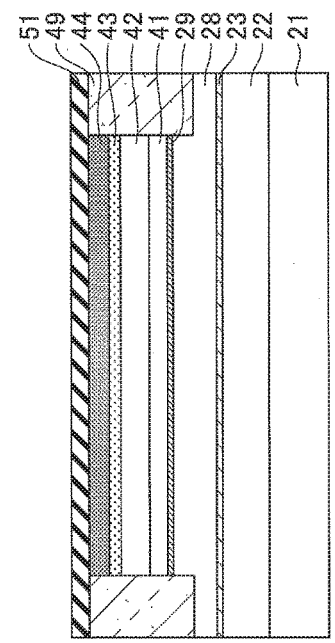
FIG. 23C illustrates a fabrication process of the SOA chip in a cross-sectional view taken along the N-N' line of FIG. 23A.
Figure 23B:
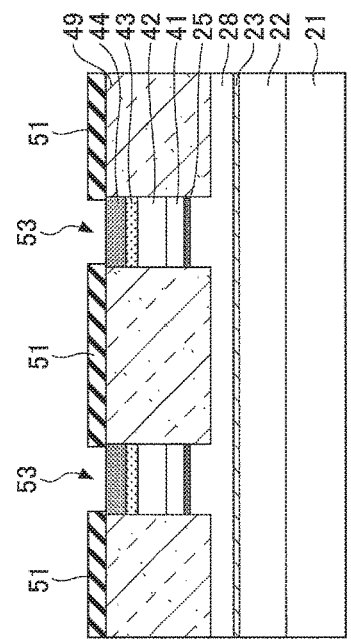
FIG. 23B illustrates a fabrication process of the SOA chip in a cross-sectional view taken along the M-M' line of FIG. 23A.

In FIG. 23A (top view), FIG. 23B (cross-sectional view taken along the M-M' line of FIG. 23A) and FIG. 23C (cross-sectional view taken along the N-N' line of FIG. 23A), a protective layer 51 is formed. The protective layer 51 is, for example, a SiO2 layer with a thickness of 0.5 µm formed by plasma CVD or any other suitable method. Then, a part of the protective layer 51 is removed by etching to form electrode windows 53 for exposing the contact layer 44 of the SOA 10.

Figure 24A:
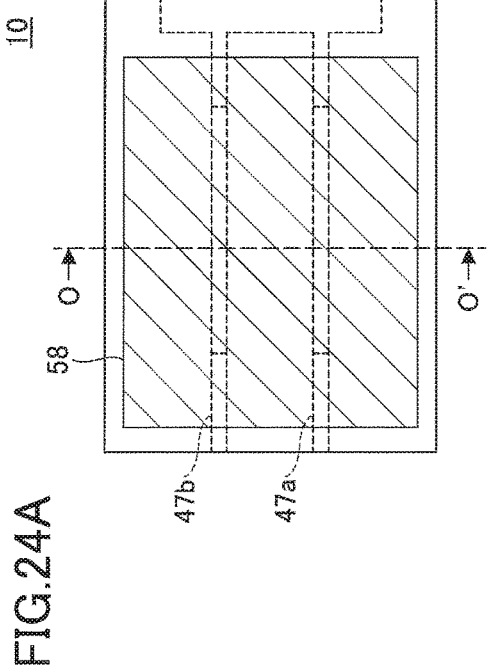
FIG. 24A illustrates a fabrication process of a SOA chip in a top view.
Figure 24C:
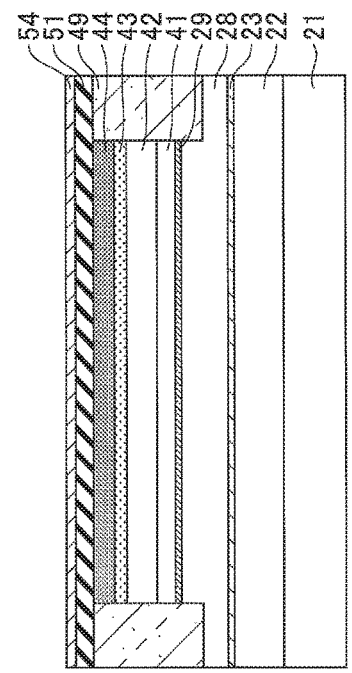
FIG. 24C illustrates a fabrication process of the SOA chip in a cross-sectional view taken along the P-P' line of FIG. 24A.
Figure 24B:
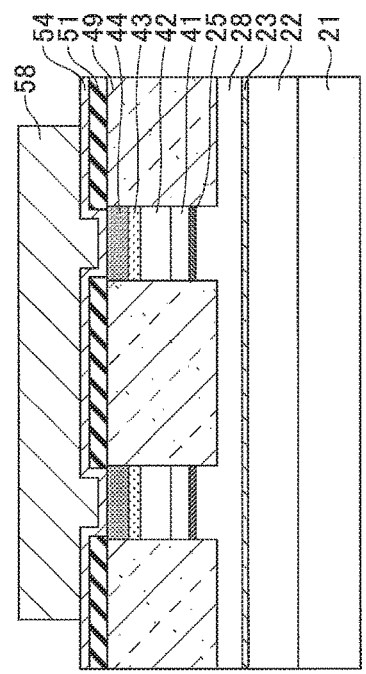
FIG. 24B illustrates a fabrication process of the SOA chip in a cross-sectional view taken along the O-O' line of FIG. 24A.

In FIG. 24A (top view), FIG. 24B (cross-sectional view taken along the O-O' line of FIG. 24A) and FIG. 24C (cross-sectional view taken along the P-P' line of FIG. 24A), a Ti/Pt layer 54 is formed over the entire surface by, for example, vacuum deposition. The thickness of the lower Ti film is, for example, 0.2 µm. The thickness of the upper Pt film is, for example, 0.25 µm. Then, a plating resist layer is formed over the entire surface and an opening is formed to expose a region for the electrode. A gold (Au) plating layer 58 is grown to a thickness of 3.0 µm in the opening using the Ti/Pt layer 54 as the plating electrode. Then, the plating resist is removed.

Figure 25A:
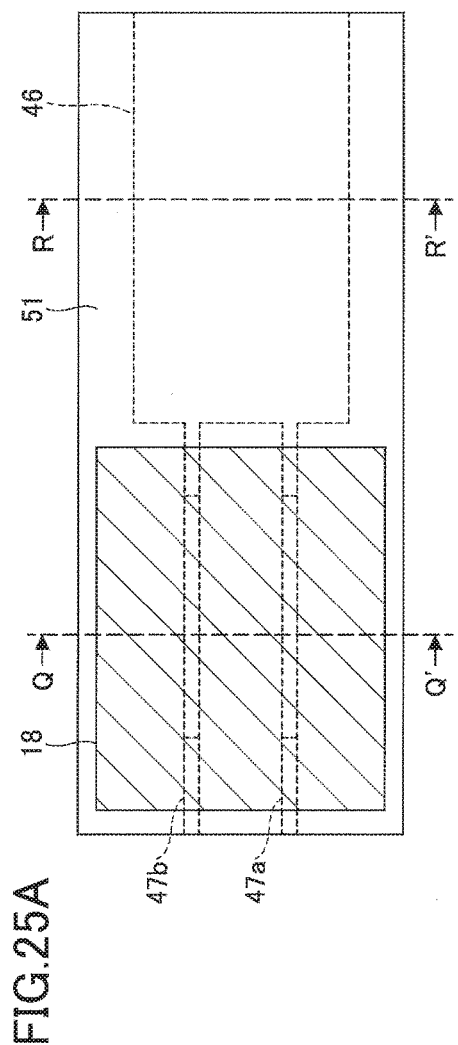
FIG. 25A illustrates a fabrication process of a SOA chip in a top view.
Figure 25C:
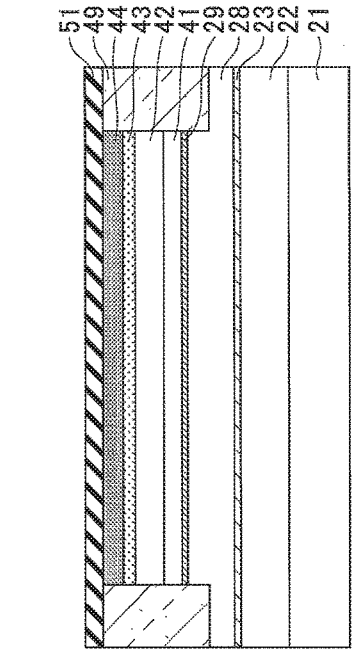
FIG. 25C illustrates a fabrication process of the SOA chip in a cross-sectional view taken along the R-R' line of FIG. 25A.
Figure 25B:
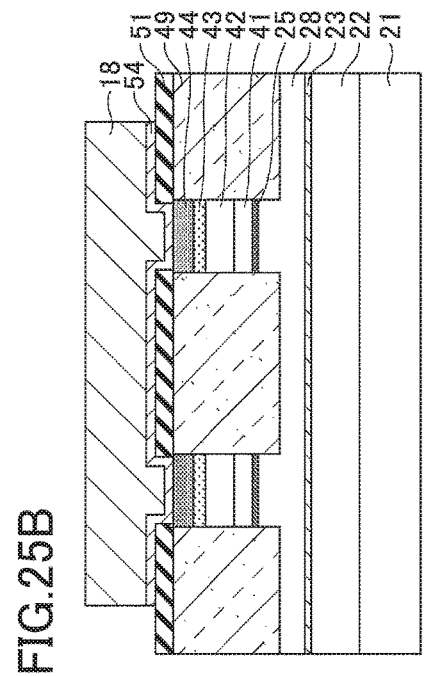
FIG. 25B illustrates a fabrication process of the SOA chip in a cross-sectional view taken along the Q-Q' line of FIG. 25A.

In FIG. 25A (top view), FIG. 25B (cross-sectional view taken along the Q-Q' line of FIG. 25A) and FIG. 25C (cross-sectional view taken along the R-R' line of FIG. 25A), the excess of the Ti/Pt layer 54 is removed by RIE, for example, using the Au plating layer 58 as a mask. Then, appropriate thermal treatment is performed, and the first electrode 18 is fabricated. In this example, a positive voltage is applied to the first electrode.

Figure 26A:
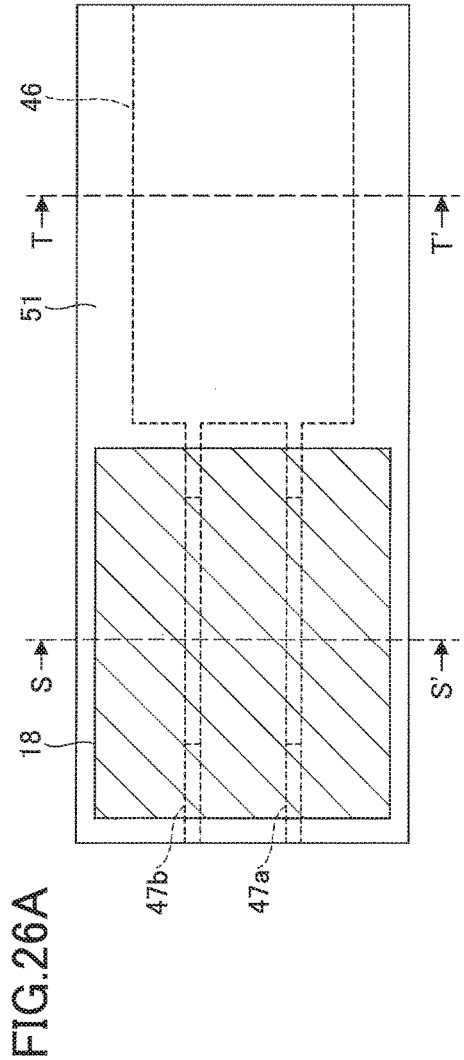
FIG. 26A illustrates a fabrication process of a SOA chip in a top view.
Figure 26C:
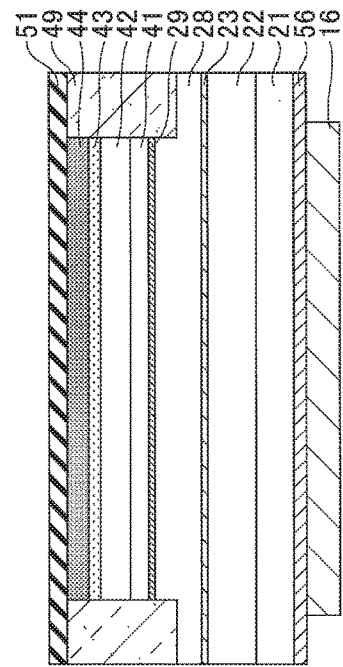
FIG. 26C illustrates a fabrication process of the SOA chip in a cross-sectional view taken along the T-T' line of FIG. 26A.
Figure 26B:
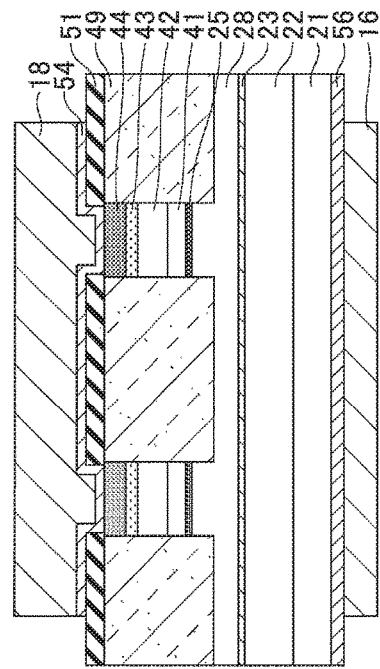
FIG. 26B illustrates a fabrication process of the SOA chip in a cross-sectional view taken along the S-S' line of FIG. 26A.

In FIG. 26A (top view), FIG. 26B (cross-sectional view taken along the S-S' line of FIG. 26A) and FIG. 26C (cross-sectional view taken along the T-T' line of FIG. 26A), the second electrode 16 is formed on the bottom face of the device by the following steps. First, the InP substrate 21 is polished until the thickness becomes 150 µm. Then Au—Ge/Au layer 56 is formed over the bottom face of the InP substrate 21 by, for example, vacuum deposition. The thickness of the Au—Ge film is 0.05 µm and the thickness of the Au film is 0.25 µm. Then, Au plating layer is grown up to 3.0 µm thickness using the Au—Ge/Au layer 56 as an electrode. Then, appropriate thermal treatment is performed and the second electrode 16 is formed on the bottom face.

Figure 27:
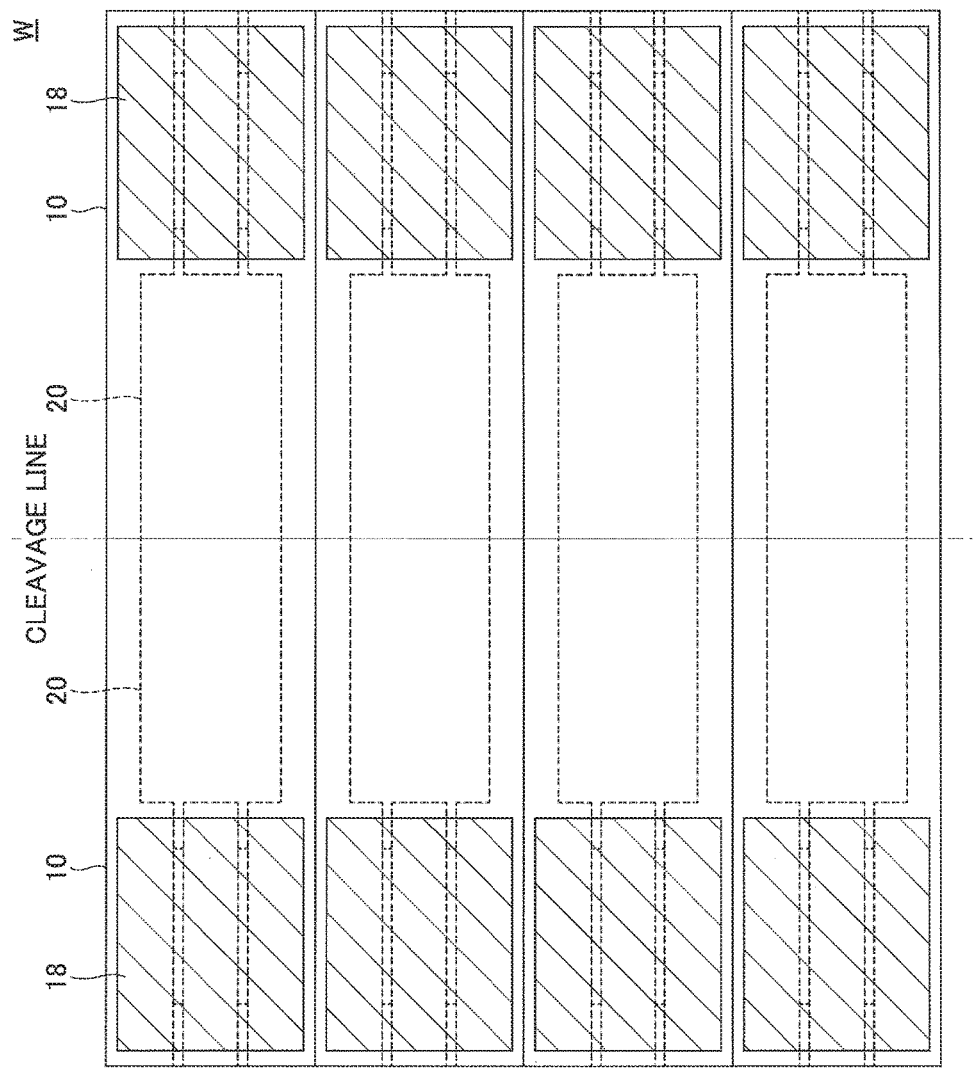
FIG. 27 illustrates a fabrication process of the SOA chip in a top view.

In FIG. 27, the wafer is separated into SOA chips making use of crystal cleavage planes. Chip areas of SOAs 10 are formed on the wafer "W" such that MMI waveguides of two chips are adjacent to each other at the cleavage line. After separating the wafer "W" into chips, an antireflective coating 19 (FIG. 12A) is formed on one end face of a chip where the input optical waveguide 12 and the output optical waveguide 13 (or the mesas 47a and 47b) extend. A high reflective coating 11 is formed on the other end face where the MMI waveguide 20 (or the mesa 46) extends. Thus, the SOA 10 illustrated in FIG. 12A, FIG. 12B and FIG. 12C is acquired.

The SOA 10 is mounted vertically onto the Si photonic chip 30 such that the end face with the input optical waveguide 12 and the output optical waveguide 13 provided faces the substrate surface of the Si photonic chip 30, as illustrated in FIG. 11A, FIG. 11B and FIG. 11C. The input end of the input optical waveguide 12 and the output end of the output optical waveguide 13 are aligned with the diffraction grating couplers 35a and 35b, respectively, formed on the Si photonic chip 30. Then, the SOA 10 is bonded to the Si photonic chip 30 with minimal gap between them in the height direction, using, for example, ultraviolet curable optical adhesive. Then, the electrode 18 of the SOA 10 is electrically connected to an electrode formed on the Si photonic chip 30 by applying silver (Ag) paste using a dispenser and performing thermal treatment. Similarly, the electrode 16 of the SOA 10 is electrically connected to another electrode on the Si photonic chip 30. In this manner, the optical circuit module 1A with the SOA 10 mounted on it is completed.

Although in the first embodiment the SOA 10 is fabricated using InP-based semiconductor materials, other suitable semiconductor materials may be used. For the platform on which the SOA 10 is mounted, a PLC with waveguide cores through a quartz substrate may be used in place of the Si photonic platform with Si core waveguides. The target wavelength may be 1.30 μm or other waveband, in place of 1.55 μm band. Materials and shapes of the protective layer 51 and the electrodes 16 and 18 are not limited to the examples described in the embodiment and suitable materials and shapes may be appropriately selected.

Second Embodiment

Figure 28A:
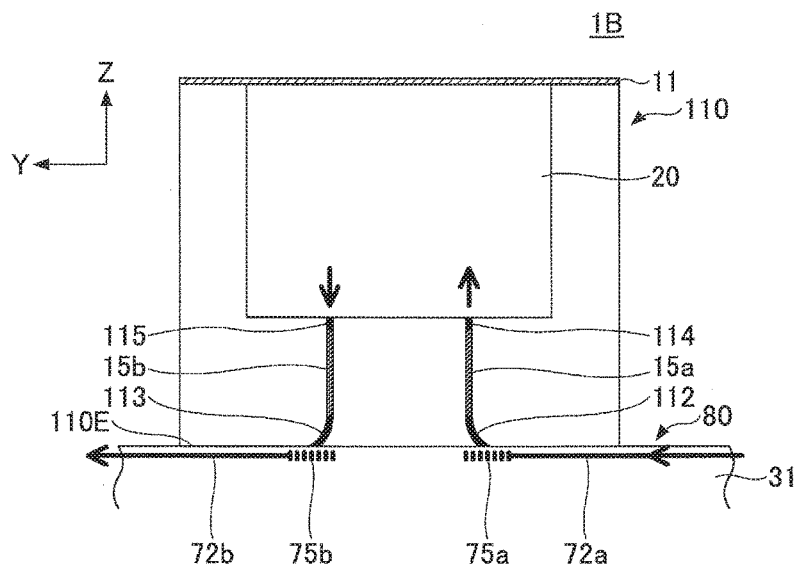
FIG. 28A is a schematic diagram of a SOA arrangement in a Y-Z plane according to the second embodiment.
Figure 28B:
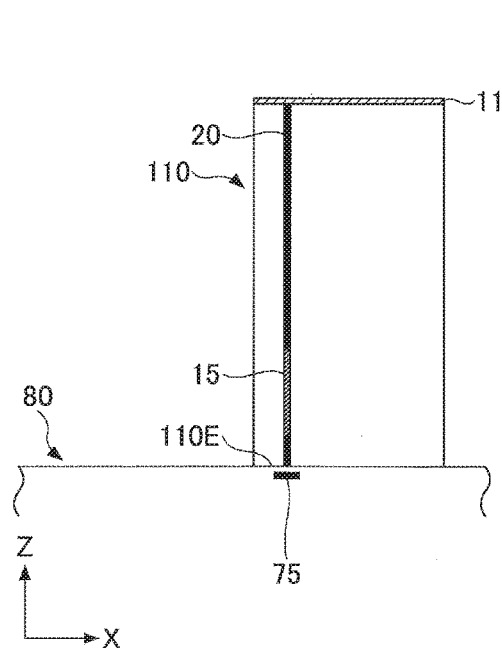
FIG. 28B is a schematic diagram of the SOA arrangement in a X-Z plane according to the second embodiment.
Figure 28C:
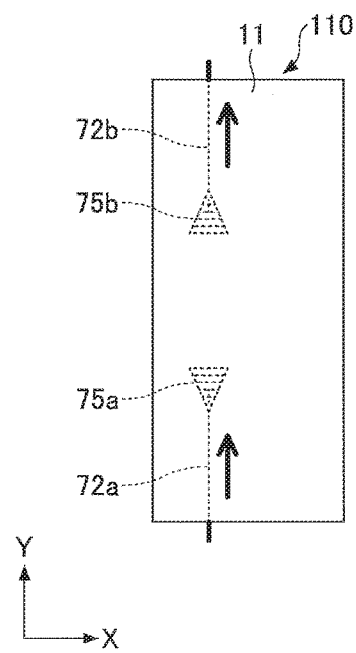
FIG. 28C is a schematic diagram of the SOA arrangement in a X-Y plane according to the second embodiment.

FIG. 28A, FIG. 28B and FIG. 28C schematically illustrate an optical circuit module 1B according to the second embodiment. In the second embodiment, an SOA 110 with oblique waveguides is mounted on a Si photonic chip 80. In place of the Si photonic chip 80, a PLC or a PLC/Si hybrid photonic substrate may alternatively be used for optical connection with the SOA 110. The SOA 110 has an input optical waveguide 112 and an output optical waveguide 113 on the same side of the chip, extending from the same end face 110E. The input optical waveguide 112 and the output optical waveguide 113 extend obliquely within a plane parallel to the major surface (Y-Z plane in FIG. 28A) of the SOA 110, at a certain angle with respect to the normal to the end face 110E.

The Si photonic chip 80 has an input optical waveguide 72a and an output optical waveguide 72b extending parallel to the major surface (Y-Z plane) of the SOA 110, of which the waveguides are connected to diffraction grating couplers 75a and 75b, respectively, at coupling positions to the SOA 110.

In general, to achieve vertical light input and output using diffraction grating couplers, multistage etching steps and/or an extra mirror structure are often required. In contrast, diffraction grating couplers 75a and 75b of the embodiment have exit/incident angles of a few degrees to ten degrees (e.g., 8 degrees) from the normal to the substrate surface of the Si photonic chip 80, and can be fabricated by ordinary film formation and etching processes. Besides, inclined optical connection is advantageous because it is preferable for the input optical waveguide 112 and the output optical waveguide 113 of the SOA 110 to extend obliquely toward the end face 110E within the plane parallel to the major surface of the SOA 110 (Y-Z plane in FIG. 11A) from the view point of preventing return light reflected back from the end face 110E on the input/output side of the SOA 110.

For the above-described reasons, the angles and directions of the light beams output from and input to the diffraction grating couplers 75a and 75b are consistent with the angles and directions of the input optical waveguide 112 and the output optical waveguide 113 of the SOA 110 in the second embodiment.

Basic structures and fabrication processes of the SOA 110 and the Si photonic chips 80 are the same as those in the first embodiment. A difference is that the input optical waveguide 112 and the output optical waveguide 113 connected to the gain regions 15a and 15b of the SOA 110 extend obliquely with respect to the normal to the end face 110E. Another difference is that the input optical waveguide 72a and the output optical waveguide 72b on the Si photonic chip 80 are arranged in the positional relationship illustrated in FIG. 28A and FIG. 28C.

The gain region 15a is connected to the optical waveguide 114 and becomes an input path to the MMI waveguide 20. The gain region 15b is connected to the optical waveguide 115 and becomes an output path from the MMI waveguide 20. The light beam incident to the SOA 110 is amplified by the gain regions 15a and 15b.

Figure 29:
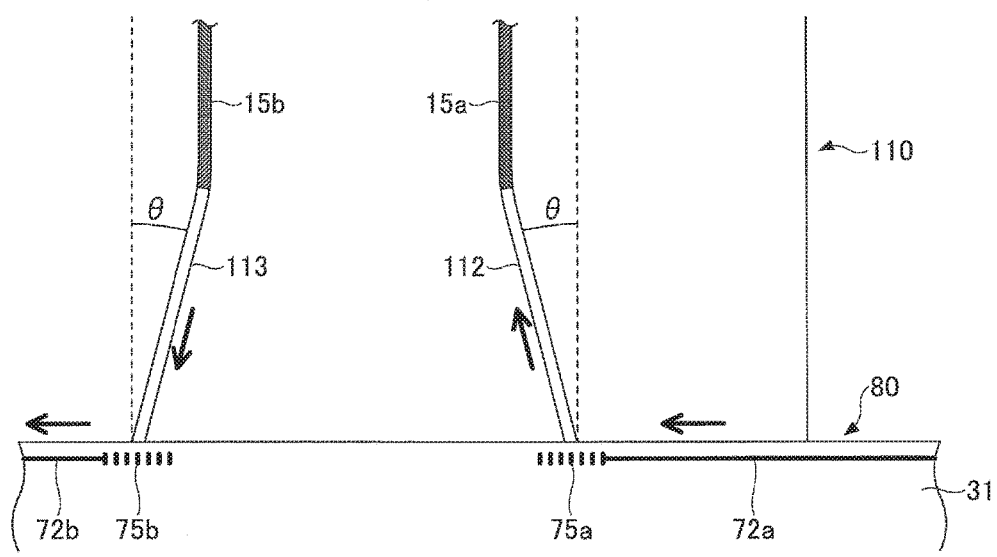
FIG. 29 is a schematic diagram illustrating a positional relationship between input/output angle of a diffraction grating coupler and oblique waveguide of a SOA chip.

FIG. 29 schematically illustrates in an enlarged view the optical coupling part of FIG. 28A. The light beam having travelled through the input optical waveguide 72a of the Si photonic chip 80 is diffracted by the diffraction grating coupler 75a and exits obliquely upward from the substrate surface at an exit angle θ. The input optical waveguide 112 of the SOA 110 extends obliquely within a plane parallel to the major surface of the SOA 110 at the same angle with the exit angle θ.

The output optical waveguide 113 of the SOA 110 extends obliquely in line symmetric to the input optical waveguide 112 within a plane parallel to the major surface of the SOA 110. The light amplified by the SOA 10 is incident on the diffraction grating coupler 75b at an incident angle θ. The light coupled to the diffraction grating coupler 75b travels through the output optical waveguide 72b.

This arrangement can achieve high optical coupling efficiency, while preventing return light reflected from the end face 110E at the input/output side.

Figure 30A:
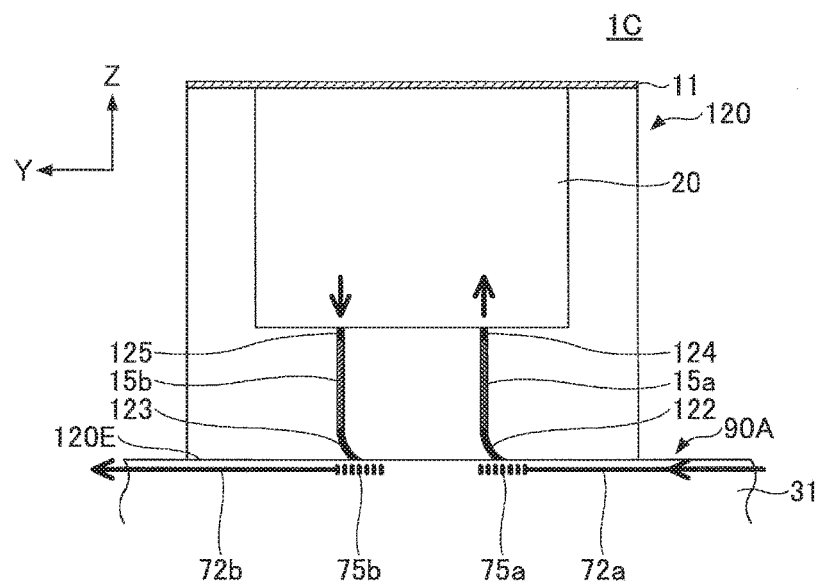
FIG. 30A is a schematic diagram of a first modification of the SOA arrangement of the second embodiment in a Y-Z plane.
Figure 30B:
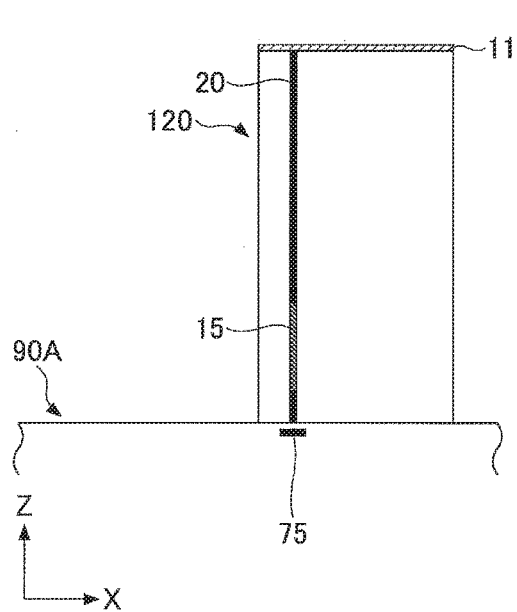
FIG. 30B is a schematic diagram of the first modification of the SOA arrangement of the second embodiment in a X-Z plane.
Figure 30C:
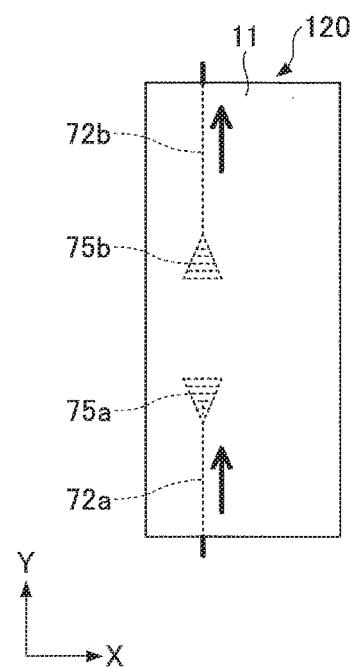
FIG. 30C is a schematic diagram of the first modification of the SOA arrangement of the second embodiment in a X-Y plane.

FIG. 30A, FIG. 30B and FIG. 30C illustrate an optical circuit module 1C, as a first modification of the second embodiment. The optical circuit module 1C has a SOA 120 mounted on a Si photonic chip 90A. In the first modification, the input optical waveguide 122 and the output optical waveguide 123 extend obliquely in the same direction. Because the input optical waveguide 122 and the output optical waveguide 123 are parallel to each other, the distance or the relative positional relationship between the input optical waveguide 122 and the output optical waveguide 123 is unchanged even though the position of the cleavage plane varies at an end face 120E of the SOA 120. This arrangement can prevent offset of optical coupling to diffraction grating couplers 75a and 75b due to positional offset of cleavage plane of the SOA 120.

In the first modification, the diffraction grating couplers 75a and 75b may be designed so as to be of a differing design, as illustrated in FIG. 30A and FIG. 30C. For example, the exit angle of the diffraction grating coupler 75a may be set to +8° (such that light having propagated through the input optical waveguide 72a exits at an angle greater than 90 degrees). The incident angle of the diffraction grating coupler 75b may be set to −8° (such that light is input to the diffraction grating coupler 75b at an acute angle with respect to the normal and is guided to the output optical waveguide 72b). With this arrangement, the input optical waveguide 72a and the output optical waveguide 72b can be formed along the same line or parallel to each other such that input light and output light travel in the same direction.

Figure 31A:
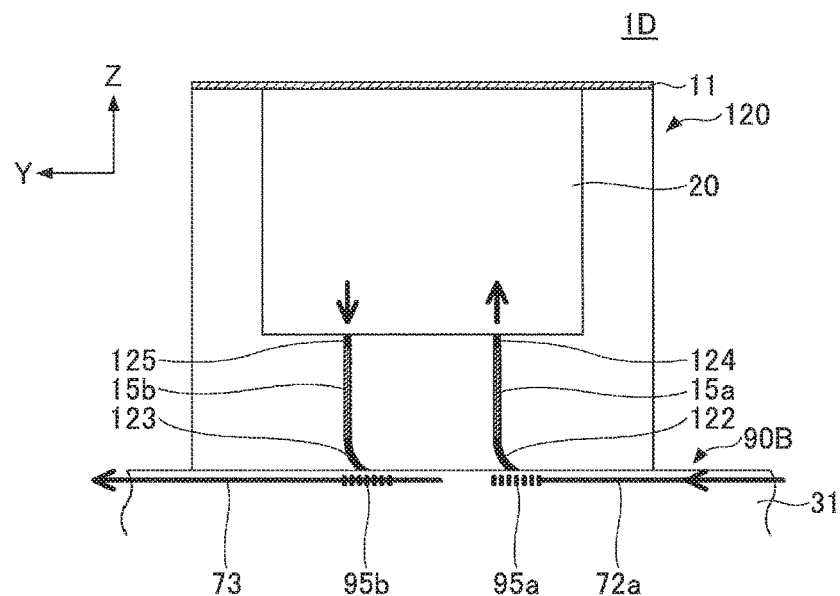
FIG. 31A is a schematic diagram of a second modification of the SOA arrangement of the second embodiment in a Y-Z plane.
Figure 31B:
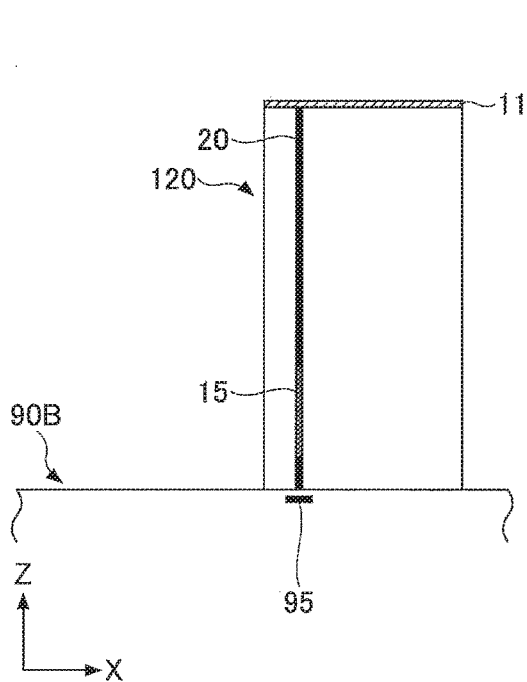
FIG. 31B is a schematic diagram of the second modification of the SOA arrangement of the second embodiment in a X-Z plane.
Figure 31C:
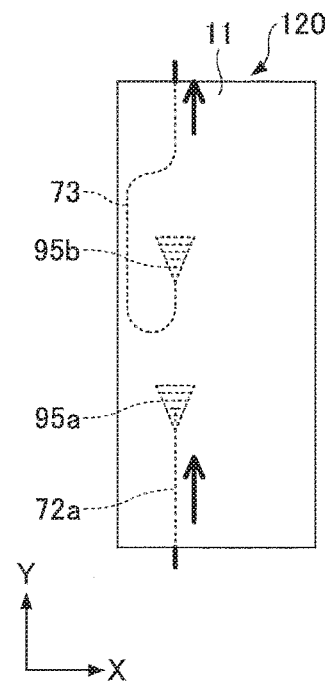
FIG. 31C is a schematic diagram of the second modification of the SOA arrangement of the second embodiment in a X-Y plane.

FIG. 31A, FIG. 31B and FIG. 31C illustrate an optical circuit module 1D, as a second modification of the second embodiment. The optical circuit module 1D has a SOA 120 mounted on a Si photonic chip 90B. In the second modification, the input optical waveguide 122 and the output optical waveguide 123 extend obliquely in the same direction as in the first modification, while the diffraction grating couplers 95a and 95b have the same design. One of the input and output optical waveguides of the Si photonic chip 90B is formed as a turnaround waveguide. In this example, the output optical waveguide 73 is a turnaround waveguide making a 180 degree turn as illustrated in FIG. 31C, whereby the optical coupling direction of the output optical waveguide 73 is adjusted and connected to the diffraction grating coupler 95b from the same direction as the input optical waveguide 72a.

The second modification can also achieve high optical coupling efficiency, while preventing return light reflecting back from the end face of the input/output side of the SOA 120.

<Applications>

Figure 32:
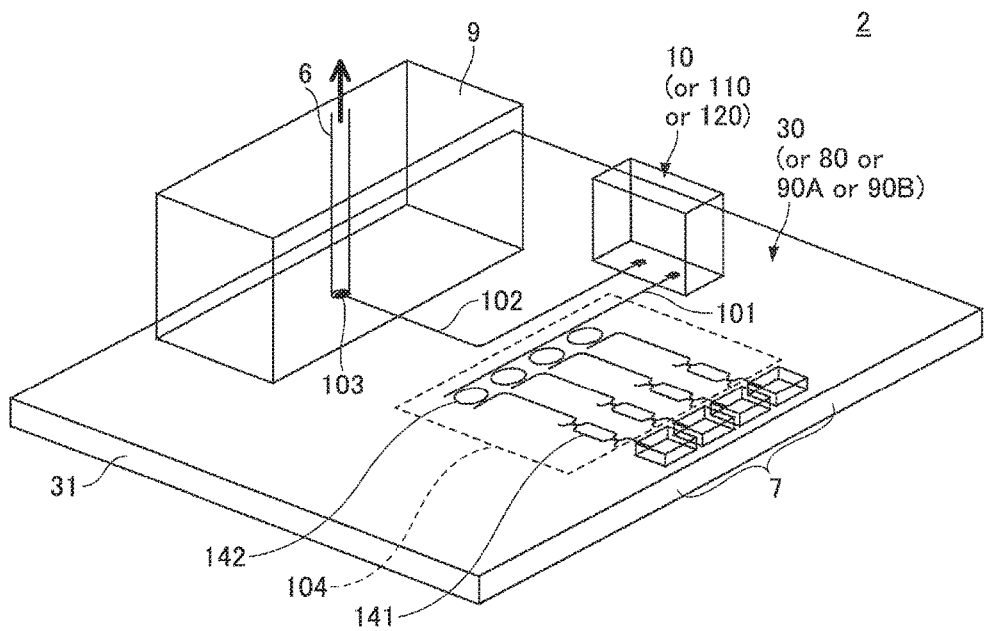
FIG. 32 illustrates an optical transmitter, as an example of the optical circuit module with a SOA chip mounted according to an embodiment.

FIG. 32 schematically illustrates an optical transmitter 2 to which any one of the SOA mounting structures of the embodiments is applicable. The optical transmitter 2 is an example of the optical circuit module. The optical transmitter 2 is, for example, a 4-channel, 4-wavelength WDM optical transmitter. The Si photonic chip 30 has an optical circuit 104, optical waveguides 101 and 102 formed on a Si substrate 31, and an SOA 10 is mounted vertical to the Si substrate 31. The optical circuit 104 may include optical modulators 141 and ring-resonator-type optical multiplexers (MUX) 142. A light source assembly 7 with semiconductor lasers with different wavelengths and a ferrule 9 holding an optical fiber 6 (serving as an external optical fiber connection are provided on the Si substrate 31. The optical fiber 6 is connected to the optical waveguide 102 by a diffraction grating coupler 103 formed on the Si substrate 31.

Continuous wave (CW) output from each of the semiconductor lasers of the light source assembly 7 travels through the optical waveguide on the Si substrate 31 and is modulated by associated one of the optical modulators 141. Modulated light beams are combined by the optical multiplexer 142, amplified by the SOA 10, guided through the optical waveguide 102, and output externally via the optical fiber 6.

The optical transmitter 2 is capable of high-level outputs because of a higher gain provided by the vertically mounted SOA 10 with reduced coupling loss.

The semiconductor photonic device mounted on the Si platform may be either SOA 110 or SOA 120 according to the second embodiment. Si photonic chip 80, 90A, or 90B of the second embodiment may be used as the Si platform. The optical modulators 141 may be Mach-Zehnder (MZ) modulators, ring-resonator type modulators, electroabsorption optical modulators, or any other suitable modulators. The optical multiplexers 142 are not limited to a ring-resonator-type, and delayed MZ interferometer optical multiplexers may be used.

Figure 33:
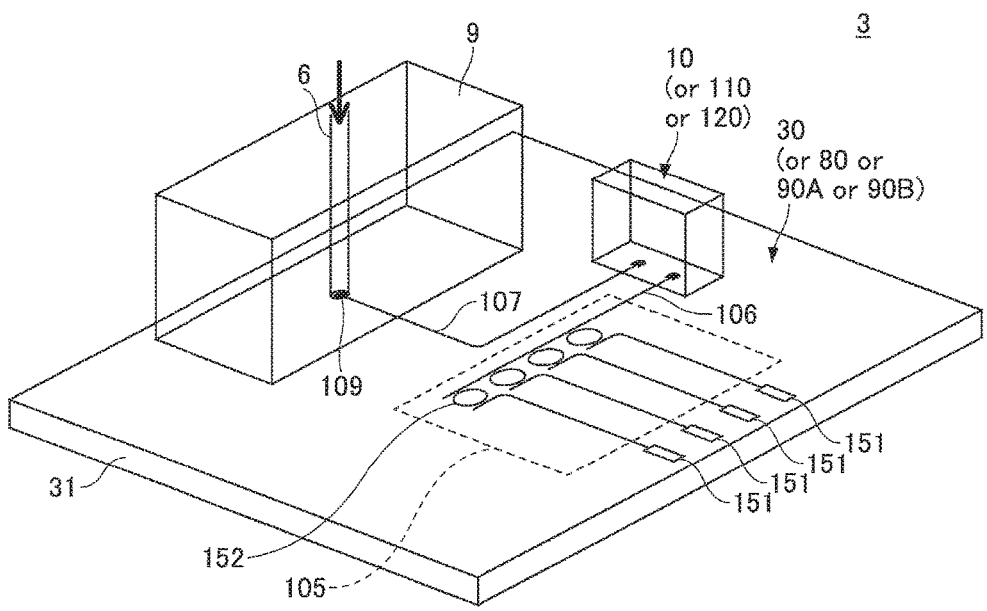
FIG. 33 illustrates an optical receiver, as another example of the optical circuit module with a SOA chip mounted according to an embodiment.

FIG. 33 schematically illustrates an optical receiver 3 to which any one of the SOA mounting structures of the embodiments is applicable. The optical receiver 3 is another example of the optical circuit module. The optical receiver 3 is, for example, a 4-channel, 4-wavelength WDM optical receiver. The Si photonic chip 30 has an optical circuit 105, optical waveguides 106 and 107 formed on a Si substrate 31, and an SOA 10 is mounted vertical to the Si substrate 31. The optical circuit 105 may include ring-resonator-type optical demultiplexers (DEMUX) 152. Four photodetectors 151, such as photodiodes, are provided corresponding to the four channels, and a ferrule 9 holding an optical fiber 6 (serving as an external fiber) is placed on the Si substrate 31. The optical fiber 6 is connected to the optical waveguide 107 by a diffraction grating coupler 109 formed on the Si substrate 31. The semiconductor photonic device mounted on the Si platform may be either SOA 110 or SOA 120 according to the second embodiment. Si photonic chip 80, 90A, or 90B of the second embodiment may be used as the Si platform. The optical demultiplexers 152 are not limited to a ring-resonator-type, and delayed MZ interferometer optical demultiplexers may be used.

Signal light having travelled through the optical fiber 6 is input to the optical waveguide 107 and then to the SOA 10, and its intensity is amplified. The amplified signal light is output to the optical waveguide 106 and demultiplexed by the optical demultiplexer 152 into each signal light according to the wavelength. Each signal light is converted into a photoelectric current signal by the associated one of the photodetectors 151.

Figure 34:
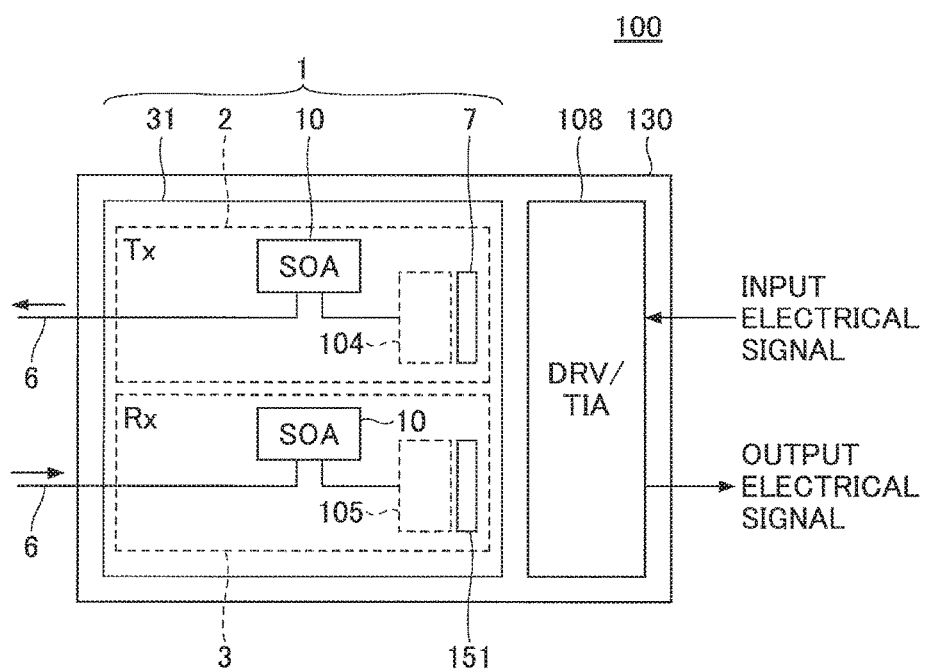
FIG. 34 is a schematic diagram of an optical transceiver to which a SOA arrangement structure of the embodiment is applied.

FIG. 34 is a schematic diagram of an optical transceiver 100 with an optical circuit module 1 and an electronic component 108 mounted on a package substrate 130. The optical circuit module 1 in this example is an optical transmitter/receiver frontend circuit formed on a Si substrate 31, and it includes the optical transmitter 2 and the optical receiver 3. As has been described in connection with FIG. 32 and FIG. 33, the SOA 10 (or 110 or 120) is mounted vertically in each of the optical transmitter 2 and the optical receiver 3. Any one of the optical circuit modules 1A through 1D may be used as the optical circuit module 1, the optical transmitter 2, and the optical receiver 3.

The electronic component 108 includes a driver that generates high-speed drive signals for driving the optical modulators 141 from input electrical signals, and transimpedance amplifiers (TIAs) for converting the photocurrent supplied from the optical receiver 3 into electric voltage signals. The optical circuit module 1 and the electronic component 108 may be connected to each other by through-silicon-via (TSV) plugs formed in the Si substrate and interconnects formed in the package substrate 130.

In each of the optical transmitter 2 and the optical receiver 3, the SOA 10 is mounted vertically and coupling loss due to positional offset of cleavage plane is reduced in the length direction of the device. Even if oblique waveguides are employed in the SOA 10, coupling loss due to positional offset of cleavage plane is reduced and optical transmission with high coupling efficiency is achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical circuit module comprising:
   a substrate with a first optical coupler connected to a first optical waveguide and a second optical coupler connected to a second optical waveguide on a substrate surface side; and a semiconductor photonic device mounted on the substrate, wherein the semiconductor photonic device has a third optical waveguide and a fourth optical waveguide extending to a first end face that faces the substrate surface, wherein the third optical waveguide is optically connected to the first optical coupler and the fourth optical waveguide is optically connected to the second optical coupler, and wherein the semiconductor photonic device is mounted on the substrate such that the first end face is abutting to the substrate surface and that the third optical waveguide and the fourth optical waveguide extend in a plane perpendicular to the substrate surface.

2. The optical circuit module as claimed in claim 1, wherein the third optical waveguide and the fourth optical waveguide extend obliquely within the plane perpendicular to the substrate surface.

3. The optical circuit module as claimed in claim 2, wherein an oblique angle of the third optical waveguide corresponds to a light input or output angle of the first optical coupler, and an oblique angle of the fourth optical waveguide corresponds to a light input or output angle of the second optical coupler.

4. The optical circuit module as claimed in claim 2, wherein the third optical waveguide and the fourth optical waveguide are inclined in a same direction within the plane perpendicular to the substrate surface.

5. The optical circuit module as claimed in claim 4, wherein the first optical coupler and the second optical coupler are of a differing design, and the first optical waveguide and the second optical waveguide are connected to the first optical coupler and the second optical coupler, respectively, from different directions.

6. The optical circuit module as claimed in claim 4, wherein the first optical coupler and the second optical coupler are of a same design, and the first optical waveguide and the second optical waveguide are connected to the first optical coupler and the second optical coupler, respectively, from a same direction.

7. The optical circuit module as claimed in claim 6, wherein one of the first optical waveguide and the second optical waveguide is a turnaround waveguide turned back to make directions of optical paths of the first optical waveguide and the second optical waveguide consistent with each other.

8. The optical circuit module as claimed in claim 1, wherein the semiconductor photonic device has a reflective coating on a second end face opposite to the first end face.

9. The optical circuit module as claimed in claim 8, wherein the semiconductor photonic device has a multi-mode interference waveguide connected to the third optical waveguide and the fourth optical waveguide at one side, and the reflective coating is provided at an opposite side of the multi-mode interference waveguide.

10. The optical circuit module as claimed in claim 8, wherein the second end face is a cleavage plane.

11. The optical circuit module as claimed in claim 1, wherein the semiconductor photonic device has a gain region connected to at least one of the third optical waveguide and the fourth optical waveguide.

12. The optical circuit module as claimed in claim 1, wherein the semiconductor photonic device has a multi-mode interference waveguide connected to the third optical waveguide and the fourth optical waveguide.

13. The optical circuit module as claimed in claim 1, wherein the substrate has
- an optical circuit connected to the first optical waveguide at an end opposite to the first optical coupler, and
- a third optical coupler connected to the second optical waveguide at an end opposite to the second optical coupler and provided for optical connection with an external optical fiber.

14. An optical transceiver comprising:
a package substrate;
an optical circuit module as claimed in claim 1 provided on the package substrate; and
an electronic component provided on the package substrate and connected to the optical circuit module.

* * * * *